United States Patent
Yanagida et al.

(10) Patent No.: US 11,404,749 B2
(45) Date of Patent: Aug. 2, 2022

(54) PROTECTOR, CONNECTION MODULE, AND END LINKING MEMBER FOR CONNECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-ken (JP)

(72) Inventors: Taiji Yanagida, Mie (JP); Hiroki Shimoda, Mie (JP); Yoshinori Ito, Mie (JP); Yoshihiro Maeda, Mie (JP); Fumihiko Ichikawa, Mie (JP); Kazuya Tsuchiya, Aichi (JP); Yuki Ogawa, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 516 days.

(21) Appl. No.: 16/360,473

(22) Filed: Mar. 21, 2019

(65) Prior Publication Data
US 2019/0305283 A1  Oct. 3, 2019

(30) Foreign Application Priority Data
Mar. 28, 2018  (JP) .............................. JP2018-061470

(51) Int. Cl.
*H01M 50/502* (2021.01)
*H01M 10/48* (2006.01)
(Continued)

(52) U.S. Cl.
CPC ....... *H01M 50/502* (2021.01); *H01M 10/482* (2013.01); *H01M 50/20* (2021.01);
(Continued)

(58) Field of Classification Search
CPC .................................................. H01M 50/502
See application file for complete search history.

(56) References Cited

U.S. PATENT DOCUMENTS

2014/0065885 A1* 3/2014 Nakayama .......... H01M 10/482
439/627
2017/0117068 A1* 4/2017 Nakayama ........... H01B 7/0045
2017/0294640 A1* 10/2017 Fukushima ......... H01M 10/482

FOREIGN PATENT DOCUMENTS

JP     2014-216270 A     11/2014
JP     2014-236523       12/2014

* cited by examiner

*Primary Examiner* — Stephan J Essex
(74) *Attorney, Agent, or Firm* — Greenblum & Bernstein, P.L.C.

(57) ABSTRACT

A protector includes a plurality of lead-out openings through which electric cables are configured to be led out, and an electric cable attachment part which is provided in a projecting manner at an opening edge part of the lead-out opening and to which the electric cables are configured to be attached through a hinge part with flexibility. The electric cable attachment part is bent toward the lead-out opening by the hinge part, and a bent state thereof is configured to be held by a holding part.

13 Claims, 22 Drawing Sheets

(51) Int. Cl.
*H01R 13/50* (2006.01)
*H01R 11/28* (2006.01)
*H01M 50/20* (2021.01)
*H01M 50/543* (2021.01)

(52) U.S. Cl.
CPC ........ *H01M 50/543* (2021.01); *H01R 11/281* (2013.01); *H01R 13/501* (2013.01); *H01M 2220/20* (2013.01)

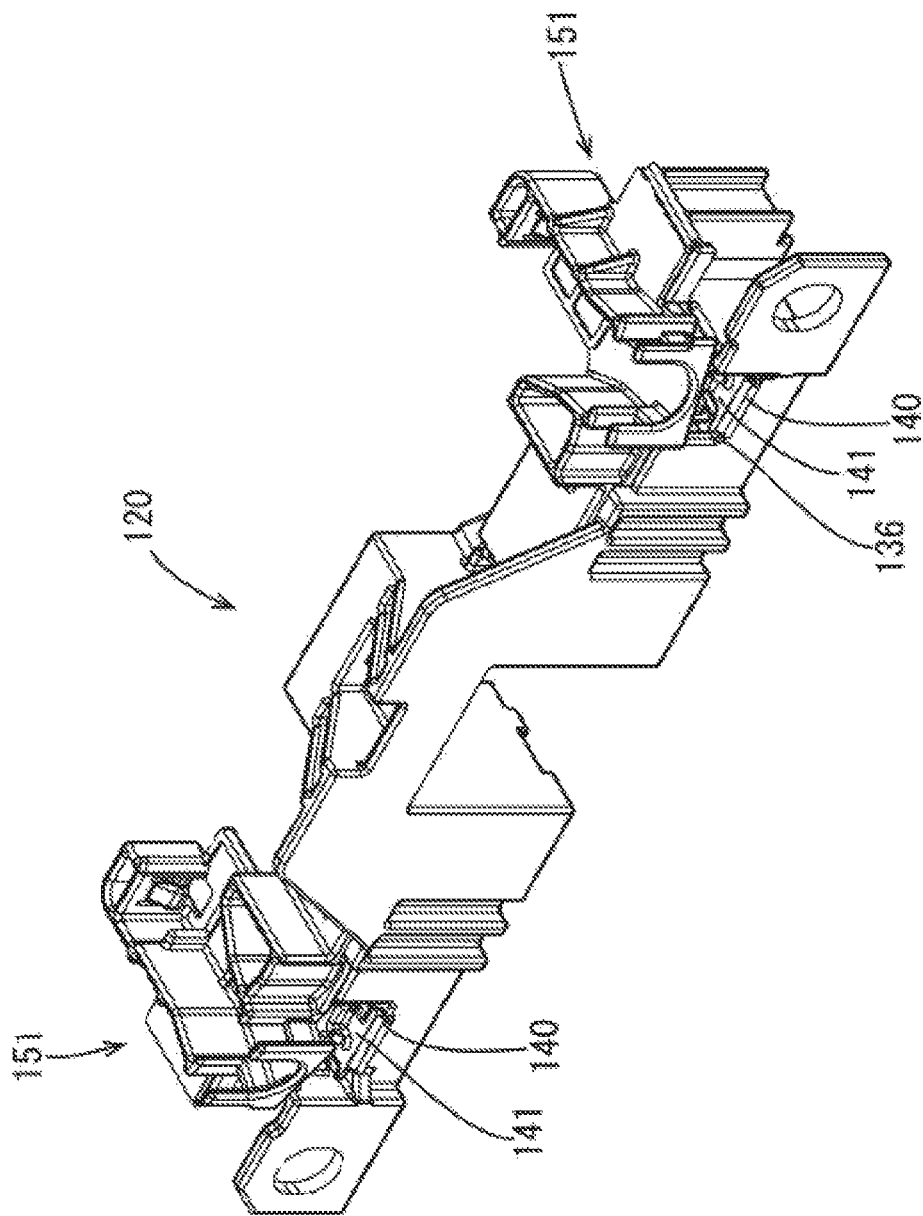

PROTECTOR, CONNECTION MODULE, AND END LINKING MEMBER FOR CONNECTION MODULE

CROSS REFERENCE TO RELATED APPLICATION

This application claims priority from Japanese Patent Application No. 2018-061470 filed on Mar. 28, 2018. The entire contents of the priority application are incorporated herein by reference.

TECHNICAL FIELD

The technology described herein relates to a protector with an electric cable attachment part, that projects from an opening for leading out an electric cable, a connection module, and an end linking member for a connection module.

BACKGROUND

A protector with a plurality of openings for leading out electric cables, and a connection module have conventionally been known. One known example is a bus bar module disclosed in Japanese Unexamined Patent Application Publication No. 2014-216270. This bus bar module is attached in an overlapped manner to a battery group including a plurality of batteries, and connects electrode terminals of the batteries with a bus bar. The bus bar module includes c plurality of bus bars, a plurality of electric cables connected to the plurality of bus bars, and a housing member that houses these bus bars and electric cables. The housing member includes a pair of housing parts that houses the bus bars and the electric cables, and a linking part that links the pair of housing parts.

The housing member includes a plurality of electric cable drawing parts used to draw the plurality of electric cables to the outside, and each electric cable drawing part includes an electric cable fixing part with a flat-plate shape for fixing the plurality of electric cables. Each electric cable fixing part is provided to project from the housing member to the outside.

In such a bus bar module, providing the electric cable fixing part in the projecting manner as described above may result in a problem that, at an end part where the electric cable is not drawn out, the projecting electric cable fixing part becomes an obstacle. Another problem is that the electric cable fixing part in a state where the electric cable is not fixed easily vibrates as the vehicle vibrates.

SUMMARY

The technology described herein was made in view of the above circumstances. An object is to provide a protector, a connection module, and an end linking member for a connection module, in which, in a case where an electric cable is not attached to an electric cable attachment part, the electric cable attachment part does not become an obstacle or the vibration from the vehicle does not have an influence easily.

An aspect of the technology described herein is a protector including a plurality of lead-out openings through which electric cables are configured to be led out, and an electric cable attachment part which is provided in a projecting manner at an opening edge part of the lead-out opening and to which the electric cables are configured to be attached through a hinge part with flexibility. The electric cable attachment part is bent toward the lead-out opening by the hinge part, and a bent state thereof is configured to be held by a holding part.

Another aspect of the technology described herein is a connection module to be attached to a power storage element group including a plurality of power storage elements that is arranged. The connection module includes: a plurality of bus bars that electrically connects the power storage elements that are adjacent; a plurality of electric cables that is connected to the plurality of bus bars; and a holding member including an electric cable housing part that houses the plurality of electric cables. The electric cable housing part includes a lead-out opening through which the electric cables are configured to be led out, and an electric cable attachment part to which the plurality of electric cables is configured to be attached through a hinge part with flexibility is provided in a projecting manner at an opening edge part of the lead-out opening. The electric cable attachment part is bent toward the electric cable housing part by the hinge part, an a bent state thereof is configured to be held by a holding part.

In the protector and the connection module as described above, the plurality of lead-out electric cables is attached to the electric cable attachment part on the lead-out opening side where the plurality of electric cables is led out. The electric cable attachment part where the plurality of electric cables is attached may or may not be bent at an arbitrary angle using the hinge part as a rotation axis in accordance with the installation position of the connection destination of the electric cable.

On the other hand, the electric cable attachment part on the lead-out opening side where the electric cables are not lead out is bent toward the lead-out opening (electric cable housing part) by the hinge part, and the bent state is held by the holding part. Therefore, it is possible to prevent the electric cable attachment part, where the electric cable s not attached, from projecting outward to become an obstacle. The electric cable attachment part that is held in the bent state is not easily affected by the vibration from the vehicle.

The protector and the connection module may have the following configuration.

The electric cable attachment part may be disposed to close the lead-out opening when the electric cable attachment part is in the bent state. The protector and the connection module having the electric cable attachment part also in the lead-out opening where the electric cable is not led out has a problem that the lead-out opening where the electric cable is not led out is left open. To solve this problem, the above configuration can make the lead-cut opening in the open state closed by the electric cable attachment part that is bent; therefore, an unintended entry of a finger or a foreign substance through the lead-out opening can be suppressed.

In the connection module, the electric cable attachment part may include, on an outer surface side, a rising wall that extends in a direction that is orthogonal to the electric cable attachment part and in a direction where the hinge part extends, and the rising wall may be disposed to close the lead-out opening when the electric cable attachment part is folded back toward the electric cable housing part by the hinge part.

The electric cable housing part may include an opening in which at least a part adjacent to the lead-out opening in a direction where the electric cable extends is open. The holding member may be formed to be integrated with a closing part through a second hinge part, and the closing part may close the opening.

With such a configuration, the opening of the electric cable housing part can be closed by rotating the closing part using the second hinge part as a rotation axis.

The electric cable attachment part may include, on an outer surface side, a rising wall that extends in a direction that is orthogonal to the electric cable attachment part and in a direction where the hinge part extends, and the electric cable attachment part that is folded back toward the electric cable housing part by the hinge part may be held in a folded-back state when the closing part that closes the opening interferes with the rising wall.

In this configuration, the folded-back state of the electric cable attachment part is configured to be held by the holding part including the rising wall and the closing part; thus, an additional holding part is not necessary.

In addition, the connection module may further includes a second electric cable housing part that is configured to house the electric cable at an outer surface of the closing part in a state where the opening is closed by the closing part. In such a configuration, another electric cable such as an electric cable for power source can be disposed in the connection module.

The holding member may include a pair of bus bar holding members that holds the plurality of bus bars along a direction where the power storage elements are arranged, and a pair of end linking members that links ends of the pair of bus bar holding members, at least a part of the electric cable housing part may be provided to the end linking member, and the electric cable attachment part may be provided to the end linking member through the hinge part.

In the connection module, in the case of linking the pair of bus bar holding members with the pair of end linking members, which is a separate member from the bus bar holding member, the pair of end linking members is desirably the same type so as to be commonly used because the cost can be reduced.

According to the above configuration, in the case forming the connection module by using the pair of end linking members, the end linking members on the side where the electric cables are led out and the side where the electric cables are not led out are common That is to say, even if the electric cable attachment part, which is necessary on the side where the electric cables are led out, is provided to the end linking member on the side where the electric cables are not led out, the electric cable attachment part can be bent toward the electric cable housing part and the bent state is held by the holding part. Therefore, it is possible to prevent the electric cable attachment part from becoming an obstacle and from being easily vibrated by the vibration from the vehicle. Accordingly, the common end linking members can be used and the manufacturing cost can be reduced.

Another aspect of the technology described herein is an end linking member for a connection module. The connection module includes: a plurality of bus bars that electrically connects a plurality of power storage elements that is adjacent in a power storage element group including the power storage elements that are arranged; a plurality of electric cables that is connected to the plurality of bus bars; and a holding member including an electric cable housing part that houses a pair of bus bar holding members holding the plurality of bus bars and the plurality of electric cables. The end linking member is configured as a pair to link ends of the pair of bus bar holding members. The end linking member includes a lead-out part that constitutes at least a part of the electric cable housing part. The lead-out part includes a lead-cut opening through which the electric cable is configured to be led out, and an electric cable attachment part to which the plurality of electric cables is configured to be attached through a hinge part with flexibility is provided in a projecting manner at an opening edge part of the lead-out opening. The electric cable attachment part is bent toward the lead-out part by the hinge part, and a bent state thereof is configured to be held by a holding part.

According to the technology described herein, provided are a protector, a connection module, and an end linking member for a connection module, in which, even if the electric cables are not attached to the electric cable attachment part, it is possible to prevent the electric cable attachment part from becoming an obstacle and from being easily vibrated by the vibration from the vehicle.

BRIEF DESCRIPTION OF THE DRAWINGS

FIG. 22 is a perspective view of the front side of the end linking member in the state where the electric cable attachment part and a closing part are folded back.

DETAILED DESCRIPTION

First Embodiment

Figure 1:
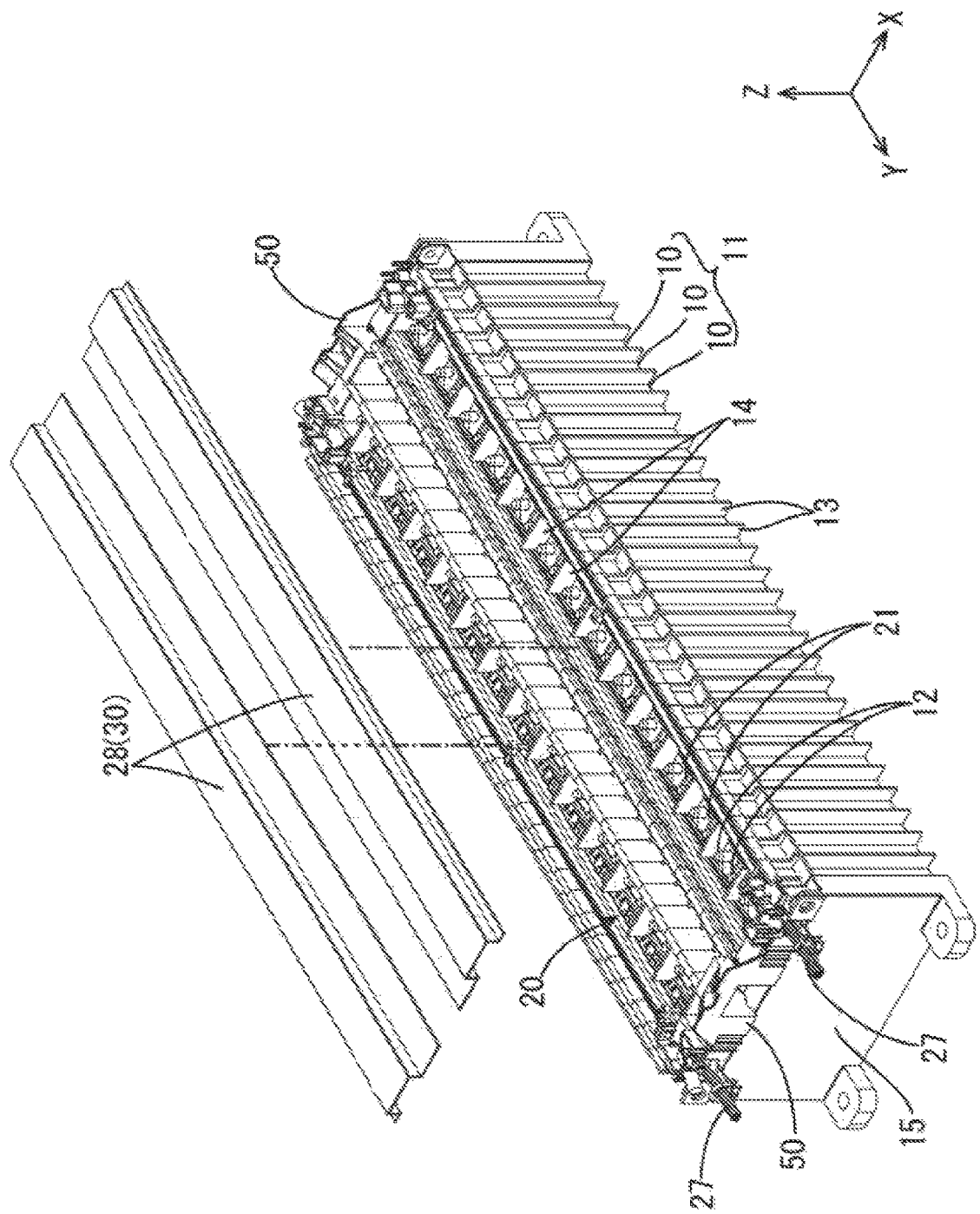
FIG. 1 is a perspective view of a power storage module according to a first embodiment.
Figure 2:
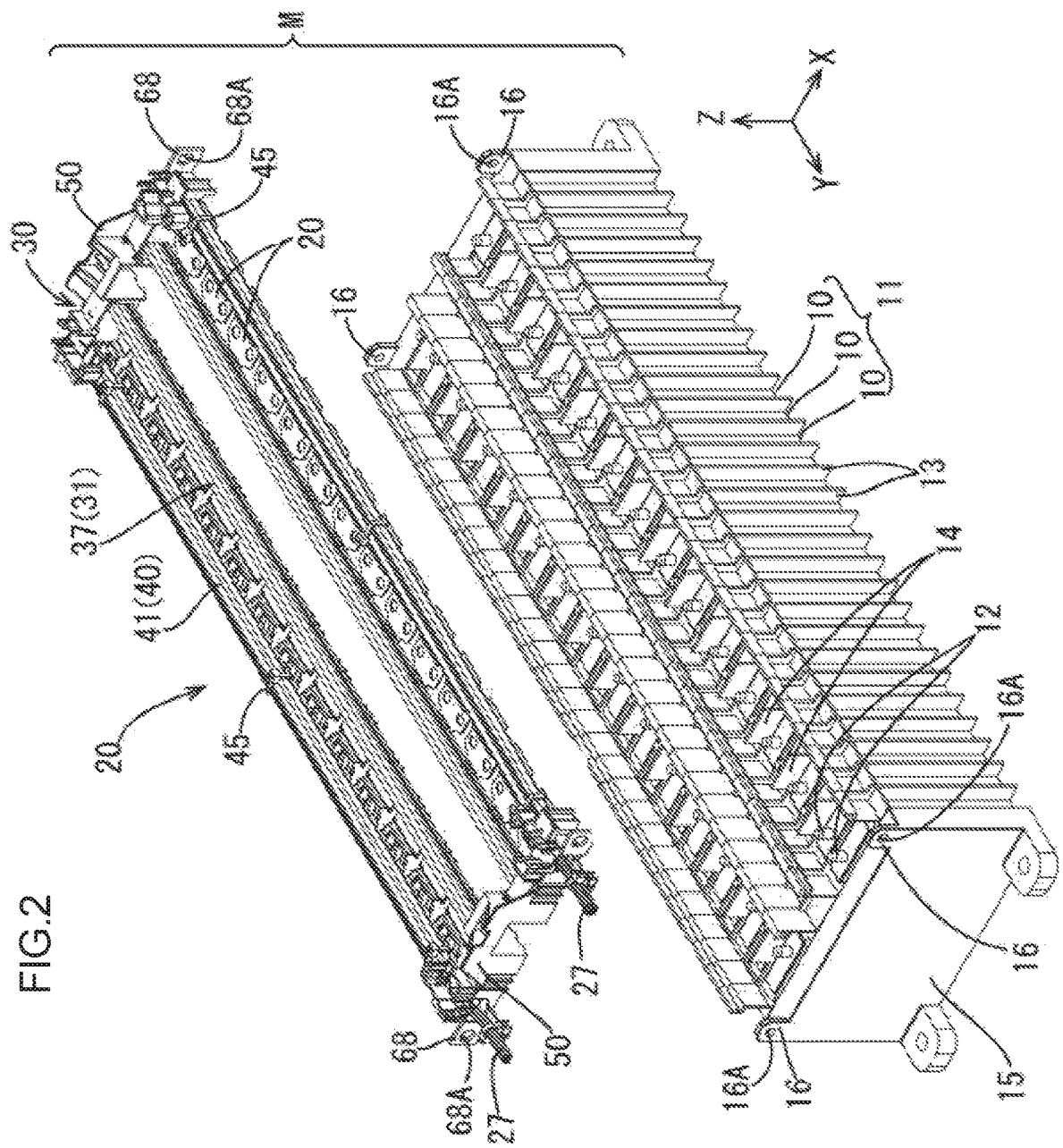
FIG. 2 is a perspective view of a power storage element group of a connection module.

A first embodiment is described with reference to FIG. 1 to FIG. 14. As illustrated in FIG. 2, a connection module 20 according to the present embodiment is attached to a power storage element group 11 including a plurality of power storage elements 10; thus, a power storage module M is formed. The power storage module M is mounted in a vehicle (not shown) such as an electric vehicle or a hybrid vehicle, and is used as a motive power source for driving the vehicle.

In the description below, in FIG. 1, the upper left side is the left and the lower right side is the right and an X direction. In addition, in FIG. 1, the lower left side is the front and a Y direction and the upper right side is the rear. Moreover, in FIG. 1, the upper side is upward and a Z direction, and a lower side is downward. In the description below, a plurality of members that is the same may be denoted by one reference sign, and the reference signs and description of the other members may be omitted.

(Power Storage Element 10)

The power storage element 10 according to the present embodiment is a secondary battery. The power storage element 10 has a substantially rectangular parallelepiped shape, and internally houses power storage components. In addition, as illustrated in FIG. 2, a pair of cylindrical electrode terminals 12 is provided on an upper surface of the power storage element 10. The electrode terminals 12 are arranged in a left-right dire (X direction) and project upward. One of the electrode terminals 12 is a positive electrode terminal and the other is a negative electrode terminal. The power storage elements 10 are arranged such that the adjacent electrode terminals 12 have different polarities.

Between the adjacent power storage elements 10, a separator 13 is provided. To the separator 13, an insulating rib 14 is provided to project upward. The insulating rib 14 insulates between the electrode terminals 12 of the adjacent power storage elements 10. The plurality of power storage elements 10 is arranged in a front-back direction (Y direction), and are sandwiched between a pair of end plates 15 disposed at both ends thereof. In this state, the power storage elements 10 are bundled with a binder (not shown) or the like, so that the power storage element group 11 is formed.

At an upper end of the end plate 15, a power storage element side fixing part 16 is provided to project upward. The power storage element side fixing part 1 used to fix the connection module 20 to be described below. The power storage element side fixing part 16 includes a bolt insertion hole 16A at its center. With a plate surface thereof facing the front-back direction, the power storage element side fixing part 16 is formed at each of four corners at an upper end of the power storage element group 11.

(Connection Module 20)

The connection module 20 has a long and thin shape that extends along a direction where the power storage elements 10 are arranged (front-back direction, Y direction), and is attached to the upper surface of the power storage element group 11.

Figure 3:
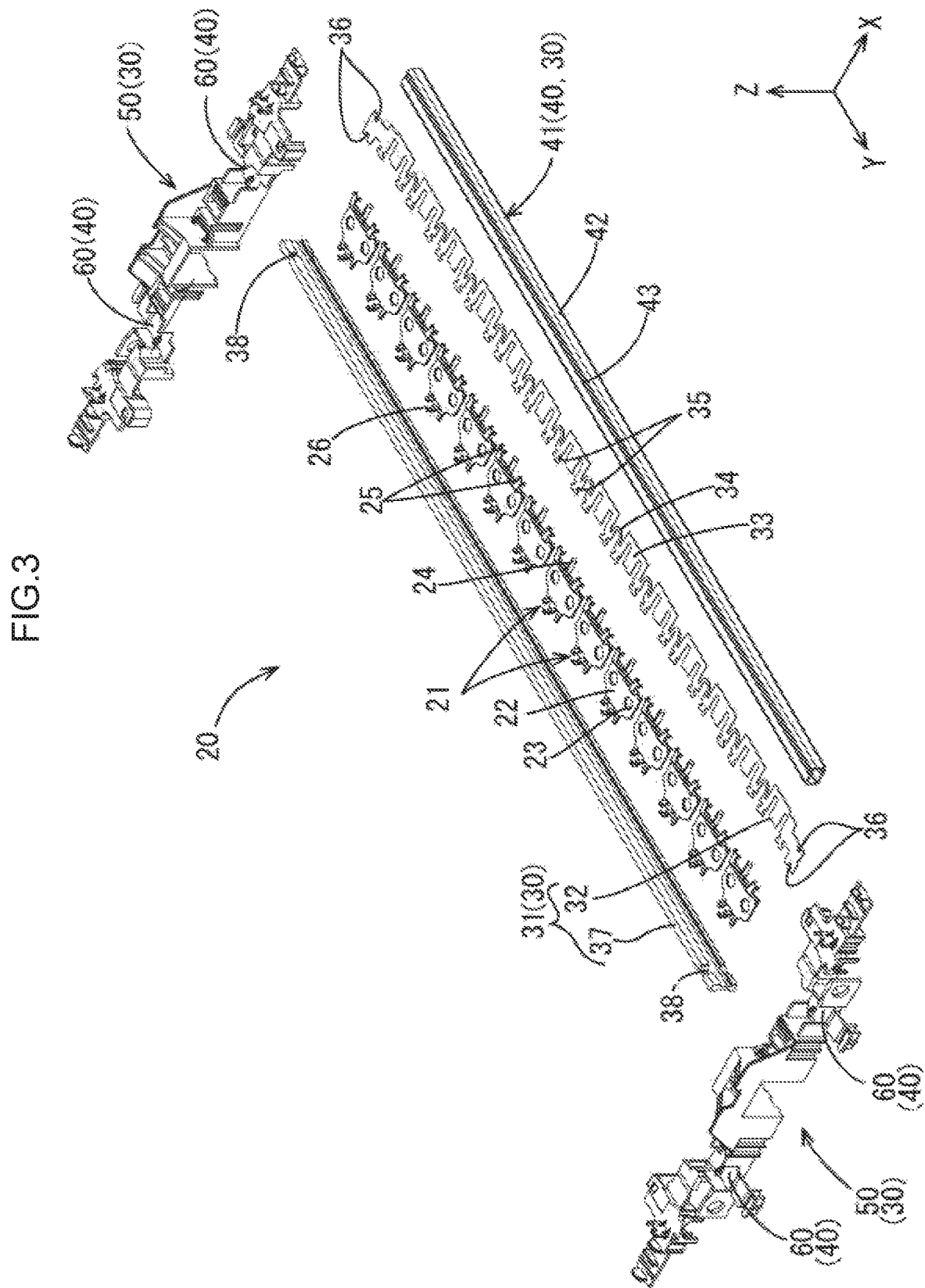
FIG. 3 is a partial exploded perspective view of the connection module.
Figure 4:
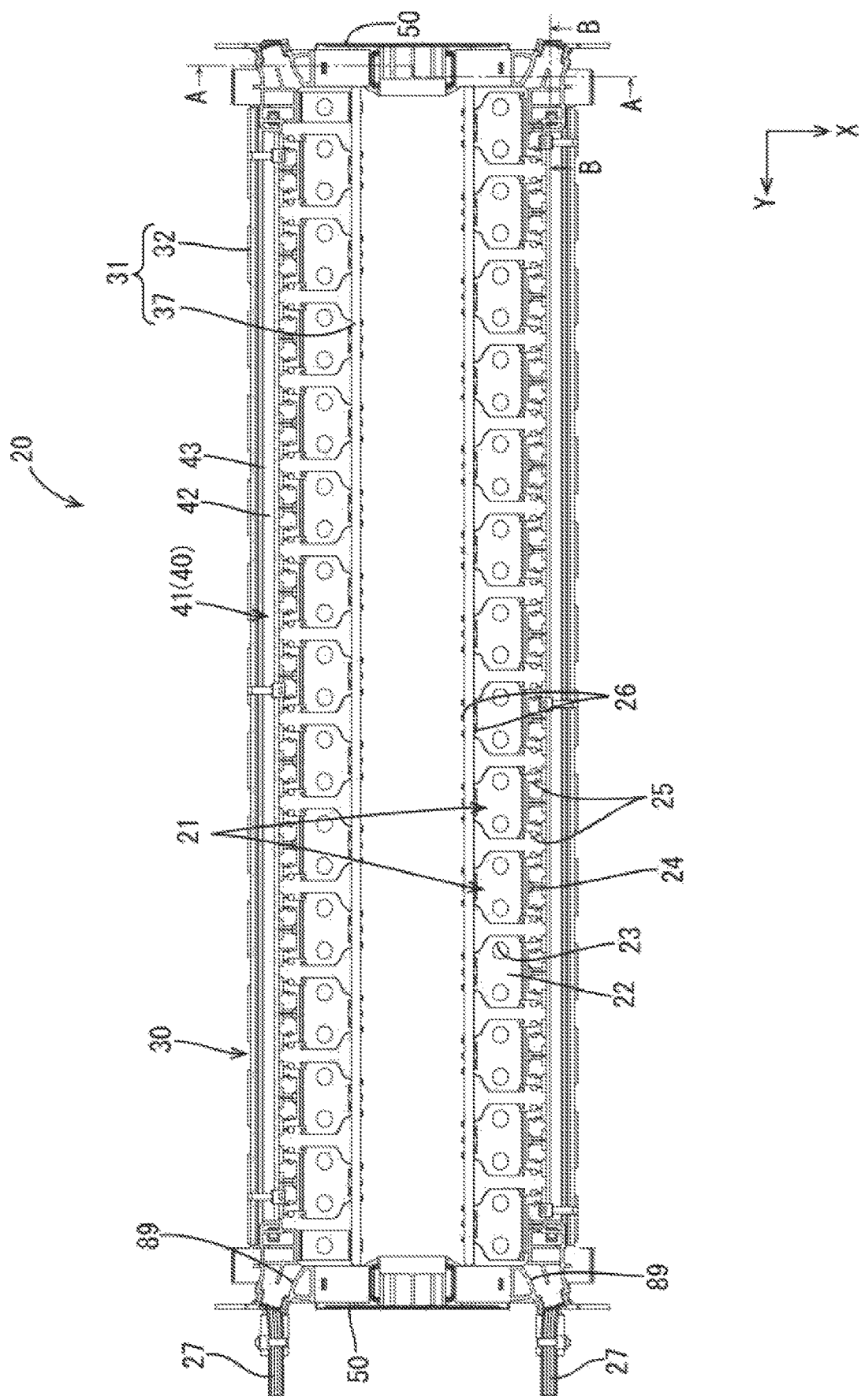
FIG. 4 is a plan view of the connection module.
Figure 5:
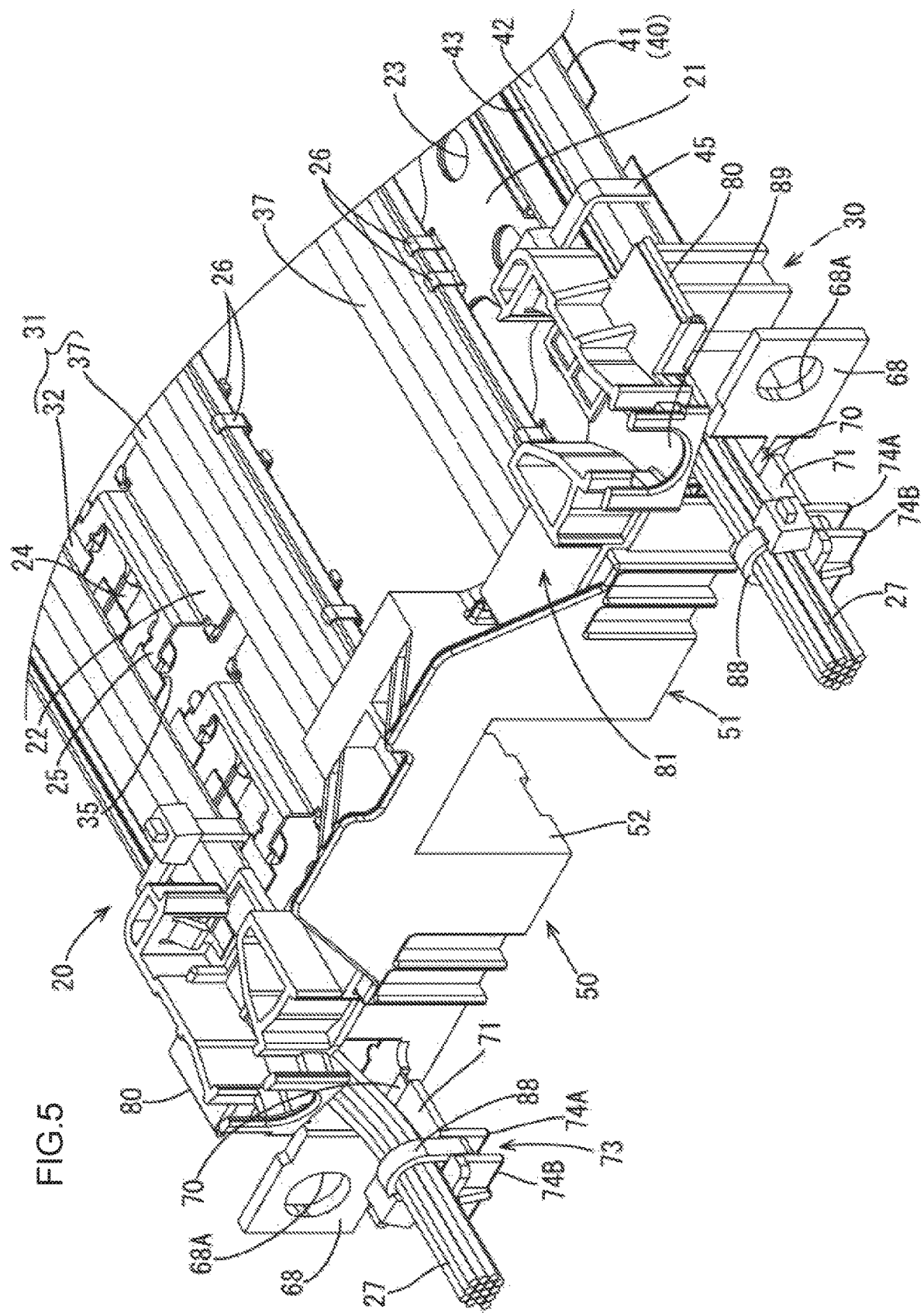
FIG. 5 is an enlarged perspective view of a main part on a front side of the connection module.
Figure 6:
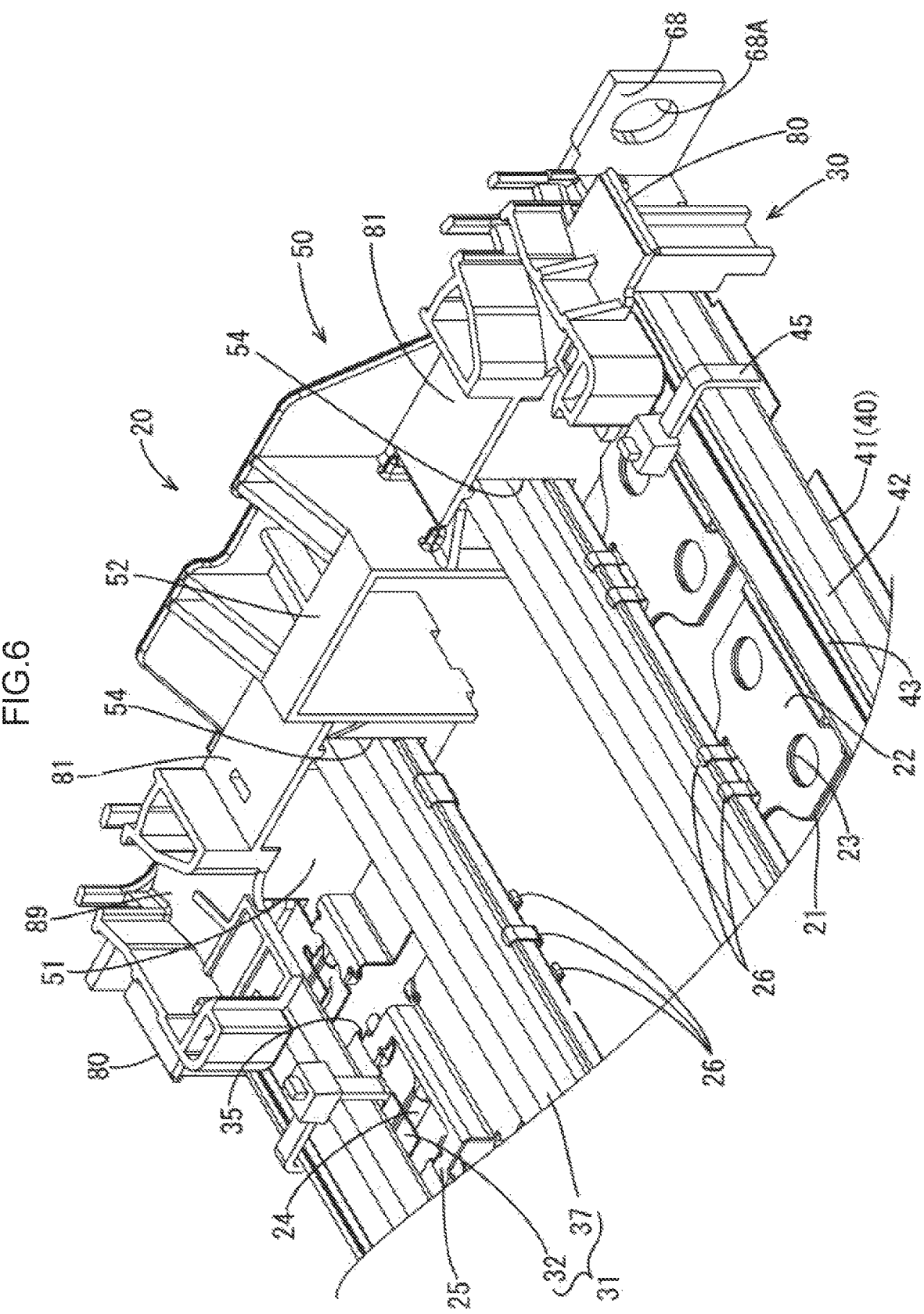
FIG. 6 is an enlarged perspective view of a main part on a rear side of the connection module.
Figure 7:
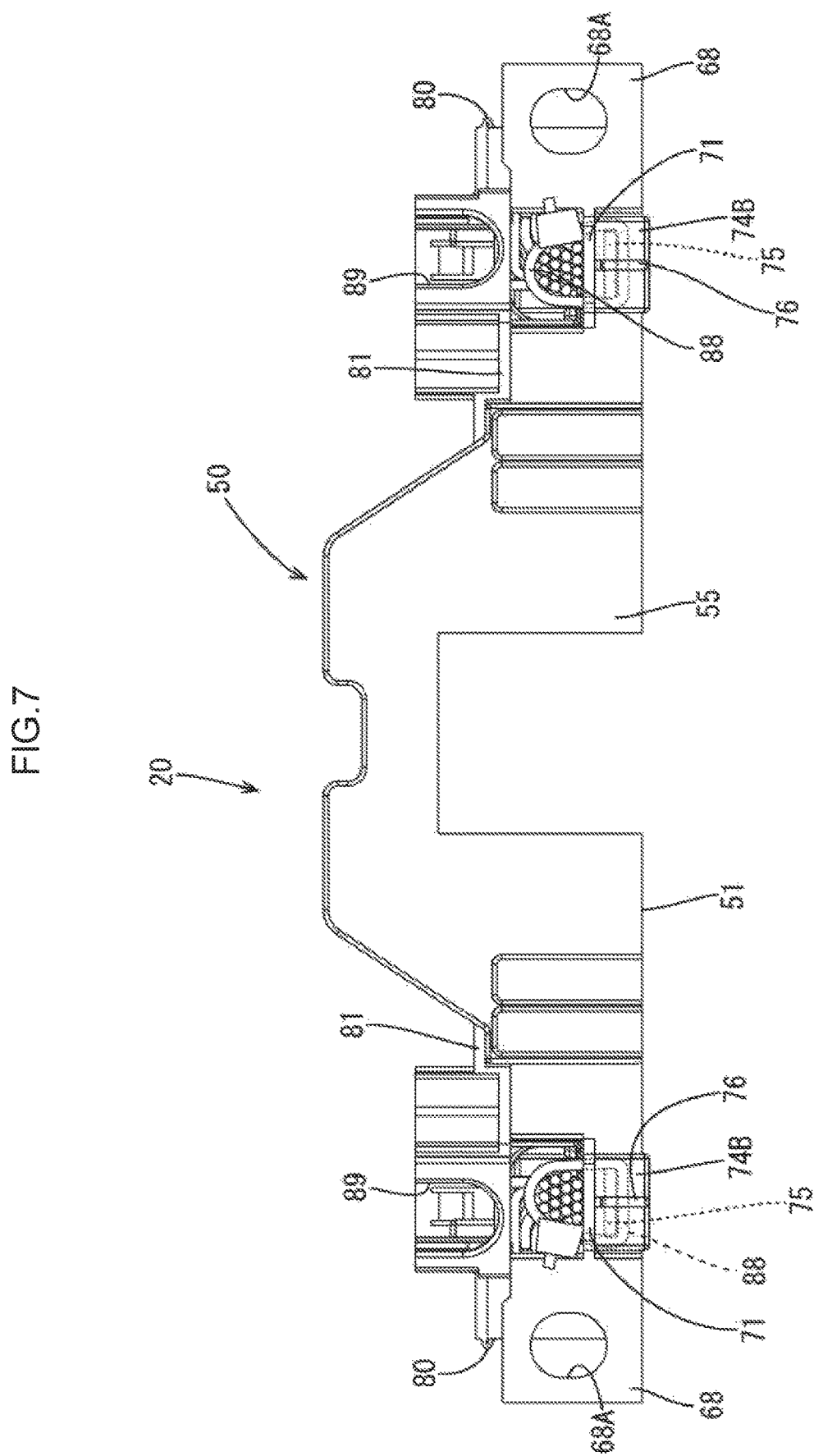
FIG. 7 is a front view of the connection module.
Figure 8:
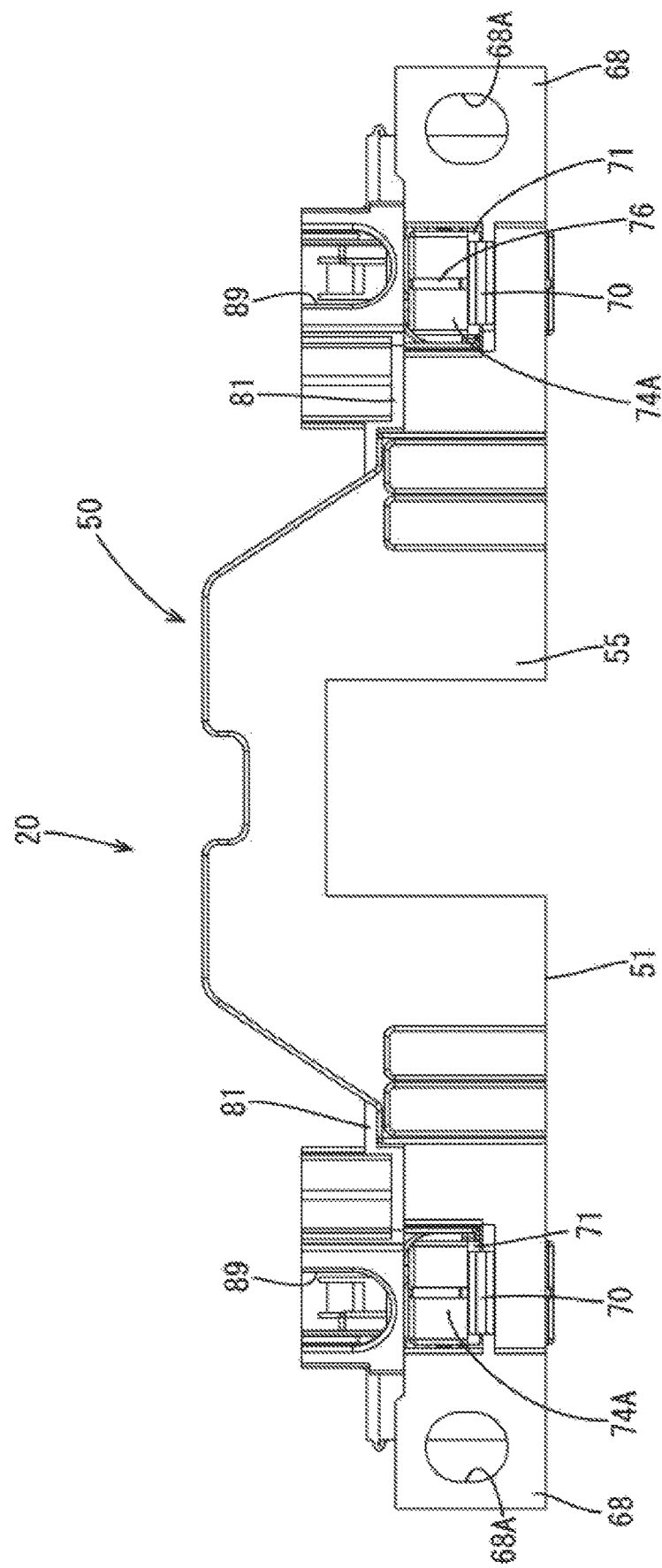
FIG. 8 is a rear view of the connection module.

As illustrated in FIG. 3, the connection module 20 includes a plurality of bus bars 21 that electrically connects between the adjacent power storage elements 10, a plurality of voltage detection lines 27 (one example of electric cable) that is electrically connected to the plurality of bus bars 21, and a holding member 30 (one example of protector) that holds the bus bars 21 and the voltage detection lines 27. The holding member 30 includes: a pair of bus bar holding members 31 that holds the plurality of bus bars 21 along the direction where the power storage elements 10 are arranged (Y direction); a pair of electric cable housing parts 40 that houses the plurality of voltage detection lines 27; a pair of end linking members 50 that links both ends of the pair of bus bar holding members 31; and a pair of covers 28 that collectively covers the plurality of bus bars 21 from above along a direction where the plurality of bus bars 21 is arranged (see FIG. 1). Note that the voltage detection lines 27 are illustrated not entirely but partially.

(Bus Bar 21)

The bus bars 21 are formed by pressing a metal plate material into a predetermined shape. Examples of the metal plate material include copper, copper alloy, iron, iron alloy, aluminum, and aluminum alloy, and the metal can be selected arbitrarily as necessary. The bus bar 21 includes a main body part 22 with the length according to the distance between the adjacent electrode terminals 12. To the main body part 22 of the bus bar 21, a pair of terminal insertion holes 23 is formed to penetrate. Through the terminal insertion holes 23, the electrode terminals 12 are inserted.

The bus bar 21 includes, on one side of a pair of side edge parts extending in a longitudinal direction, a connection part 24 that extends from a central part of the side edge part to the outside and that is connected to the voltage detection line 27 as illustrated in FIG. 3. A pair of first hooking parts 25 is provided to have the connection part 24 therebetween. The first hooking parts 25 extend similarly to the outside and are hooked in a bus bar linking sheet 32 to be described below. At a central part of the side edge part on the other side, a second hooking part 26 is provided. The second hooking part 26 is hooked in a bus bar holding rail 37 to be described below that extends to the outside.

The bus bar 21 is electrically connected to the electrode terminal 12 when a bolt (not shown) is screwed in a state where the electrode terminal 12 is inserted through the terminal insertion hole 23.

(Bus Bar Holding Member 31)

The bus bar holding member 31 includes a pair of bus bar linking sheets 32 that links the plurality of bus bars 21 in a line, and the bus bar holding rail 37 that holds the plurality of bus bars 21 linked by the bus bar linking sheet 32 in a line along the direction where the power storage elements 10 are arranged. The bus bar linking sheet 32 has flexibility, and the bus bar holding rail 37 has rigidity.

The bus bar linking sheet 32 is formed of an insulating material such as polyethylene terephthalate (PET), polystyrene (PS), polycarbonate (PC), or polyamide (PA), and has a thin and long shape as a whole. The bus bar linking sheet 32 has a shape that a plurality of plate-shaped parts 33 with a substantially E-like shape whose length in the front-back direction (Y direction) substantial) coincides with that of the bus bar 21 is linked with a U-shaped coupler 34. The tolerance can be absorbed by bending the coupler 34.

Each plate-shaped part 33 is provided with a first hooked part 35 that is hooked in the first hooking part 25 of the plurality of bus bar 21 described above. That is to say, the first hooking parts 25 of the bus bars 21 are hooked in the first hooked parts 35, so that the bus bars 21 are linked in a line by the bus bar linking sheet 32 and held thereby.

In addition, at both ends of the bus bar linking sheet 32 in the extending direction (front-back direction, Y direction), a sheet-side cutoff part 36 to which a fitting rib 67 of the end linking member 50 to be described below is fitted is formed.

On the other hand, the bus bar holding rail 37 is formed of an insulating material similar to that of the bus bar linking sheet 32, and has a rectangular rail-like shape that can be hooked in the second hooking part 26 of the bus bar 21 described above. The second hooking part 26 of the bus bar 21 is hooked in a manner that the second hooking part 26 is movable along the bus bar holding rail 37.

Near both ends of the bus bar holding rail 37 in the extending direction (front-back direction, Y direction), a rail-side cutoff part 38 to which a stopper rib 56 of the end linking member 50 to be described below is fitted is provided.

The plurality of bus bars 21 is linked with a substantially equal space therebetween when the first hooking part 25 is hooked in the first hooked part. 35 of the bus bar linking sheet 32 in the side edge part on one side, and in the side edge part on the other side, the bus bars 21 are held in a line shape when the second hooking part 26 is hooked in the bus bar holding rail 37.

(Electric Cable Housing Part 40)

The holding member 30 includes the electric cable housing parts 40 housing the plurality of voltage detection lines 27 connected to the bus bars 21. In the present embodiment, as illustrated in FIG. 3, the electric cable housing part 40 includes a protective tube 41 that covers the voltage detection line 27 so as to surround the voltage detection line 27 along a direction where the bus bar holding member 31 extends (front-back direction, Y direction), and a lead-out part 60 provided to the end linking member 50 and disposed in both ends of the protective tube 41 to be described below.

The protective tube 41 is a long and thin pipe-shaped member whose cross-sectional shape is substantially rectangular. The protective tube 41 is formed of, for example, soft resin such as polyvinyl chloride (PVC), olefin based elastomer (TPO), styrene based elastomer (SVC), or vinyl acetate (EVA), rubber, or the like. A bottom wall on a lower part of the protective tube 41 includes a slit along its extending direction. An outer surface of a ceiling wall 42 on an upper side includes a cutoff part 43 along its extending direction. By bending this cutoff part 43, the slit, of the protective tube 41 can be opened.

On the other hand, the lead-out part 60 connected to the end of the protective tube 41 is provided to the end linking member 50 as described above, and guides the plurality of voltage detection lines 27 led from the relatively soft protective tube 41 to the outside of the holding member 30. The lead-out part 60 will be described in more detail.

(End Linking Member 50)

The end linking member 50 is a member that links the ends of the pair of bus bar holding members 31 (a pair of bus bar linking sheets 32 and a pair of bus bar holding rails 37). The end linking member 50 has a long and thin shape as a whole; specifically, both sides of a crosslinking part 52 forming a gate shape extends in the left-right direction. In addition, the end linking members 50 are formed to have a bilateral symmetric shape along the crosslinking part 52. In the description below, the end linking member 50 disposed on the left in FIG. 3 corresponds to the reference and the lower left in FIG. 3 corresponds to the front side.

Figure 11:
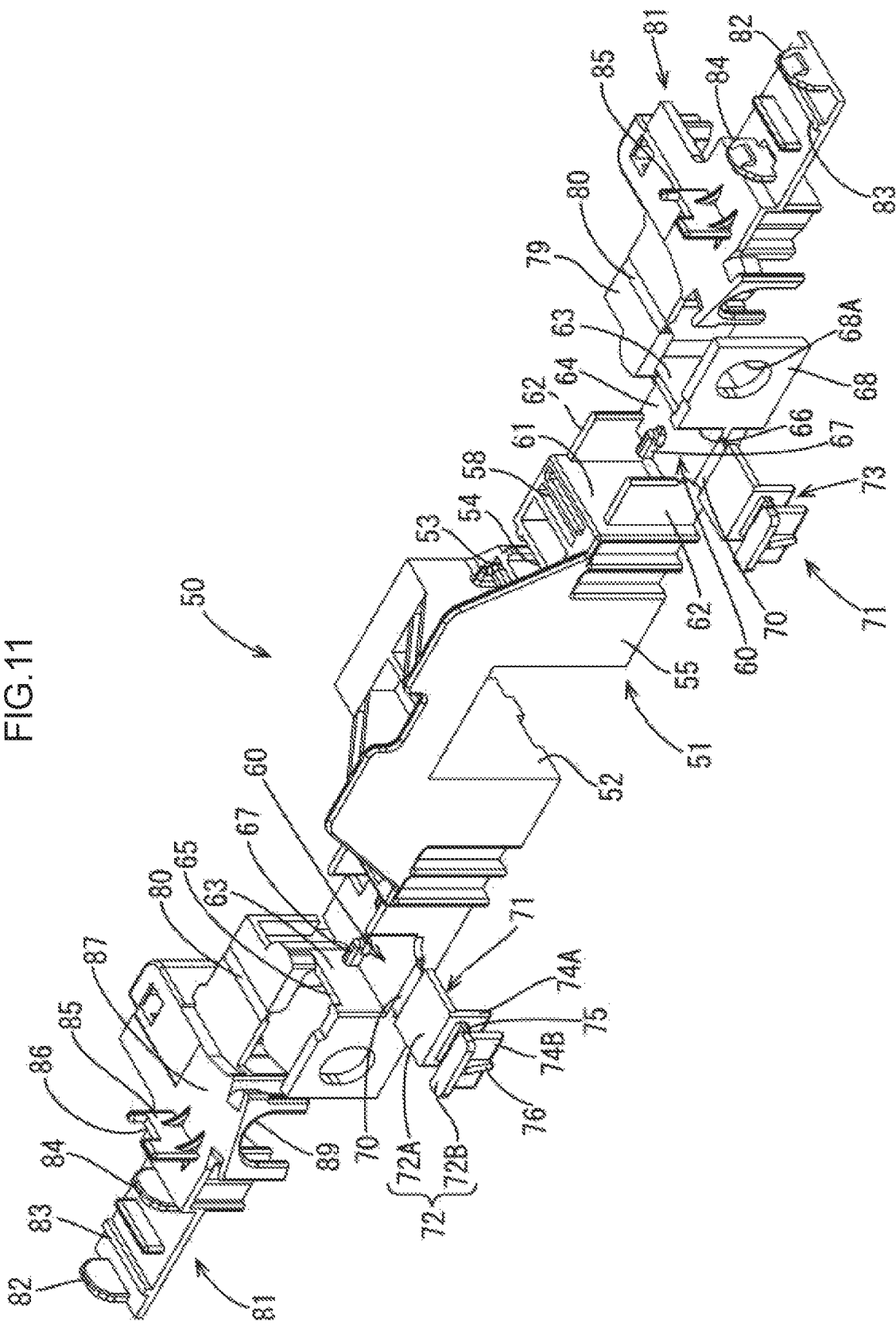
FIG. 11 is a perspective view of a front side of an end linking member.
Figure 12:
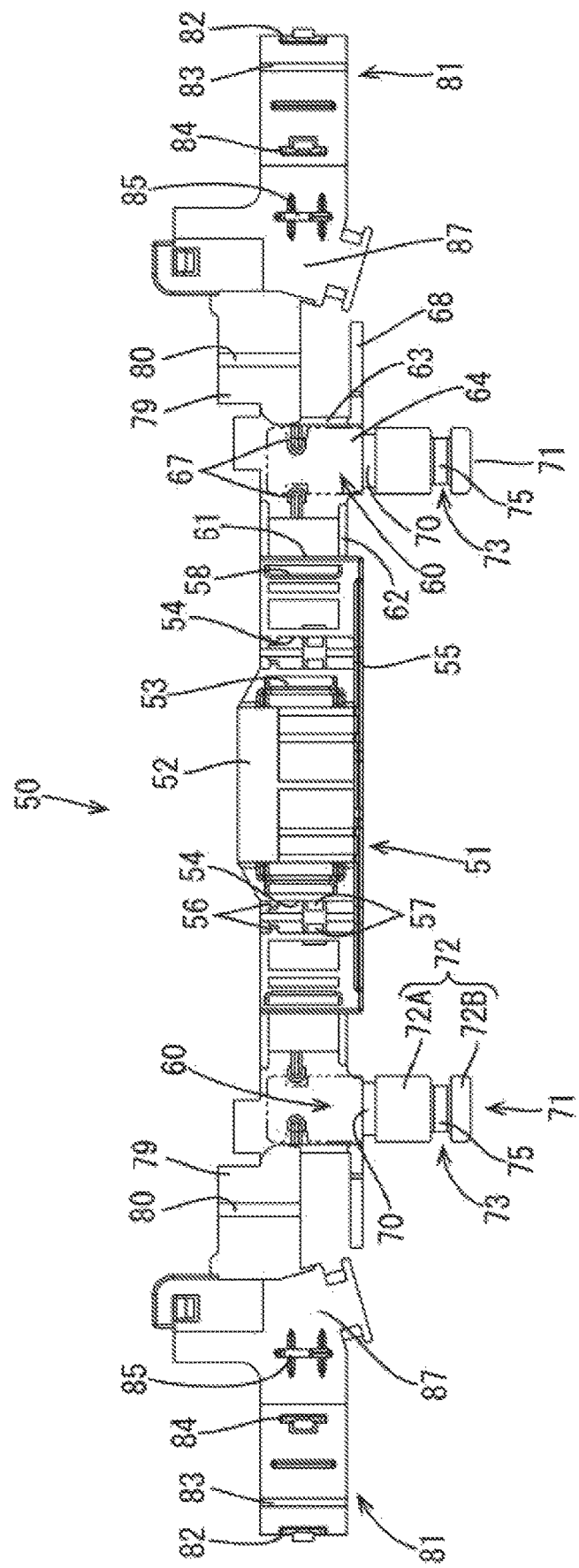
FIG. 12 is a plan view of the end linking member.
Figure 13:
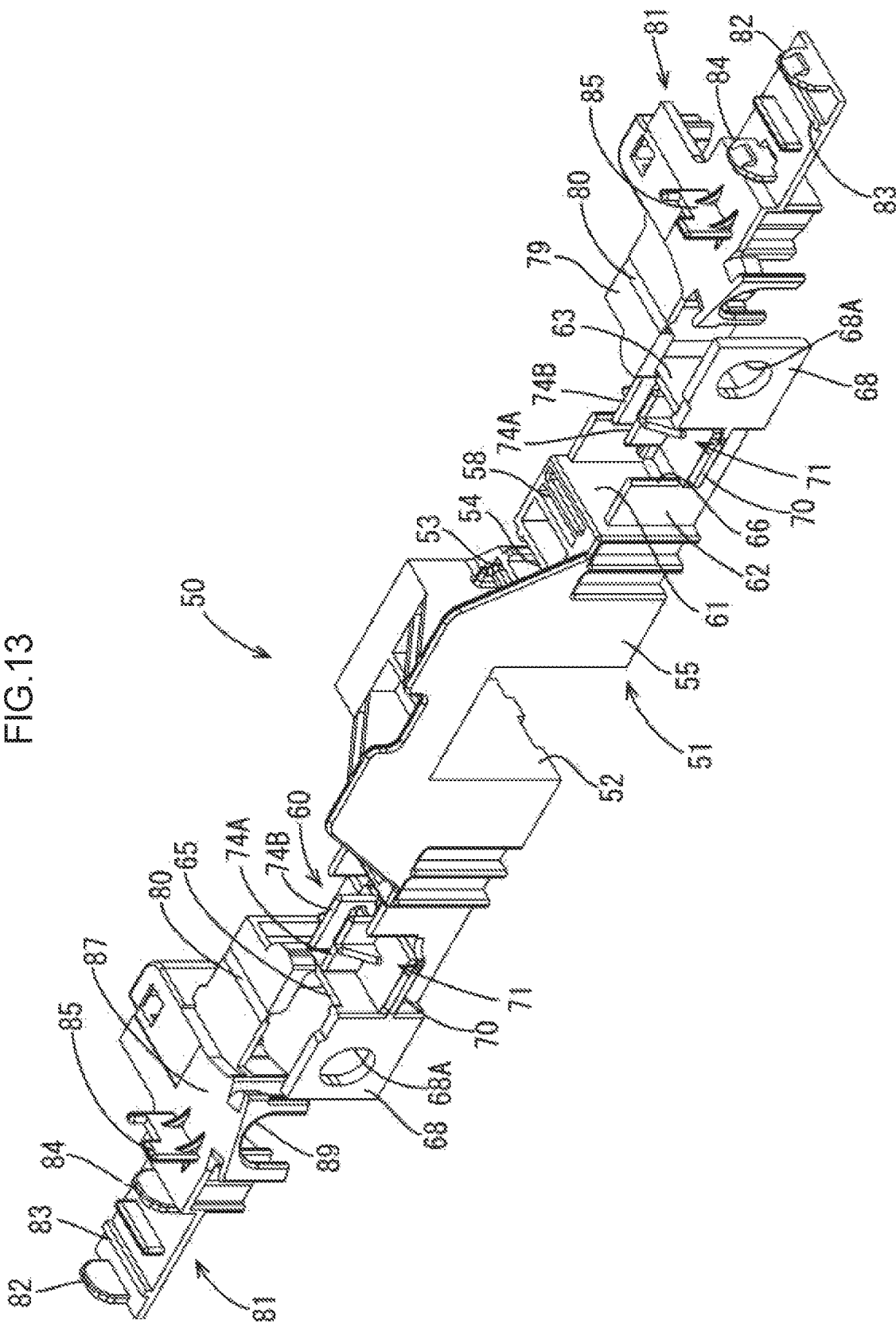
FIG. 13 is a perspective view of the front side of the end linking member in a state where an electric cable attachment part is folded back.
Figure 14:
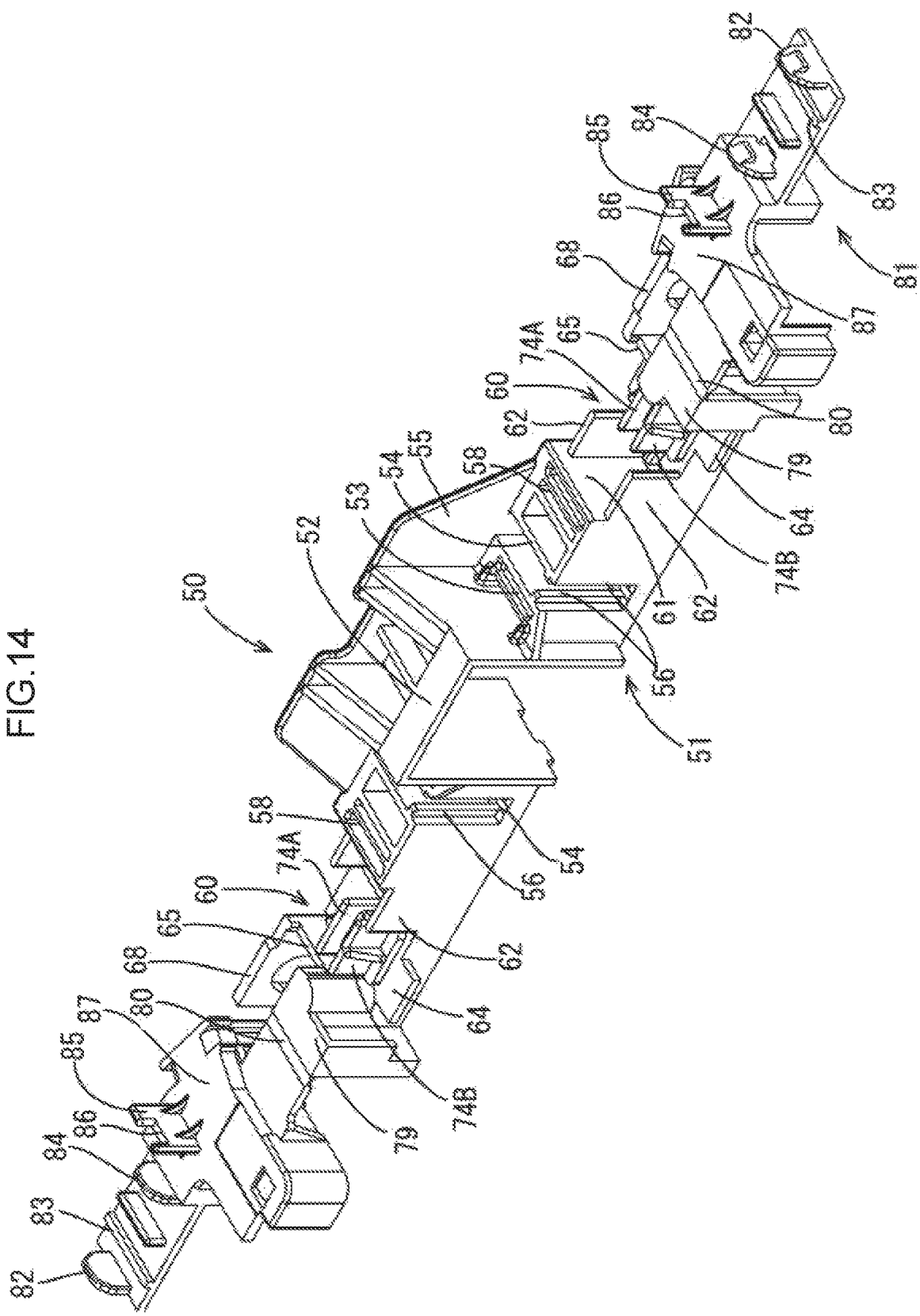
FIG. 14 is a perspective view of a rear side of the end linking member in a state where the electric cable attachment part is folded back.
Figure 15:
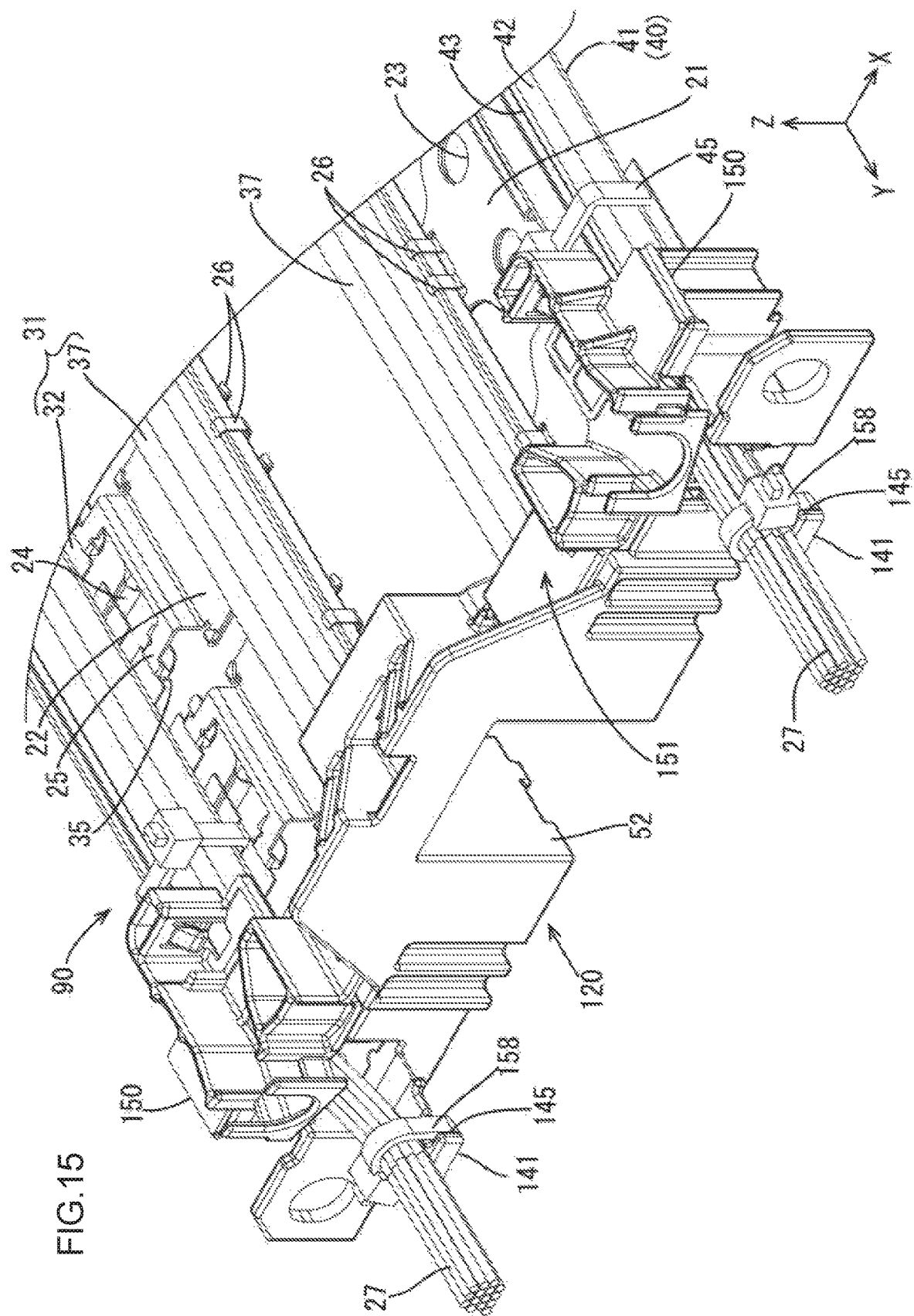
FIG. 15 is an enlarged perspective view of a main part of a front side of a connection module according to a second embodiment.
Figure 16:
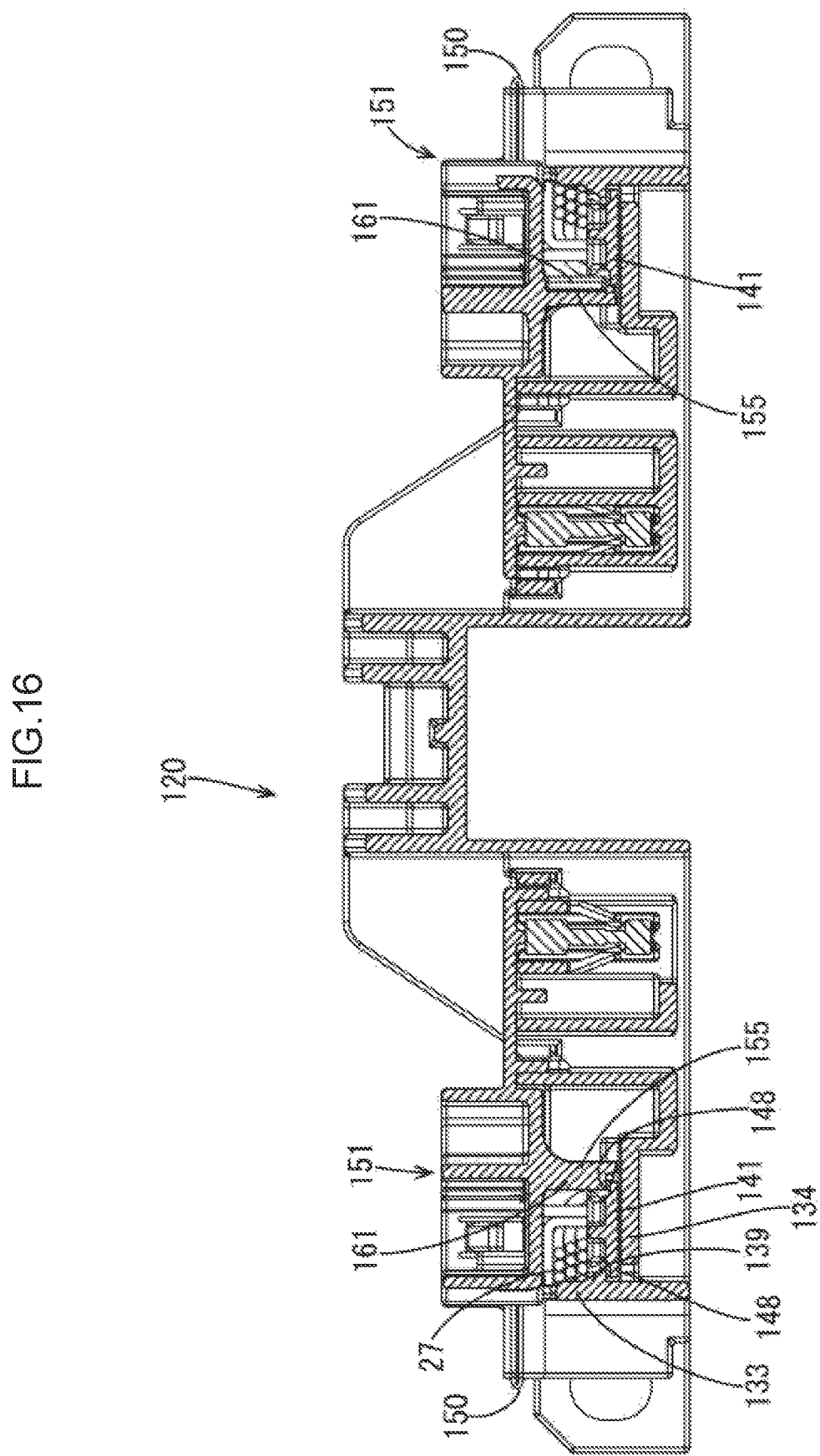
FIG. 16 is a longitudinal cross-sectional view of the connection module.

For example, as illustrated in FIG. 11 and FIG. 12, on the right and left sides of the crosslinking part 52, a pair of first locking parts 53, a pair of rail holding grooves 54, a pair of second locking parts 58, and a pair of lead-cut parts 60 are provided in the order from the inside. The first locking part 53 and the second locking part 58 include holes 53A and 58A, respectively. The holes 53A and 58A extend in the up-down direction and can receive a first locking piece 82 and a second locking piece 84, respectively. In addition, the first locking part 53 and the second locking part 58 include engaged parts 533 and 583, respectively. To the engaged parts 533 and 583, engaging claws 82A and 84A provided to the locking pieces 82 and 84 are configured to be engaged, respectively (see FIG. 9).

The rail holding groove 54 has a groove-like shape to which the end of the bus bar holding rail 37 is fitted, and a front end (front end of holding member 30) is closed by a front wall 55. Near a rear end of the rail holding groove 54, the stopper ribs 56 that project inward from a pair of groove walls are provided (see FIG. 14). The stopper ribs 56 are fitted into the rail-side cutoff parts 38 of the bus bar holding rail 37.

Figure 9:
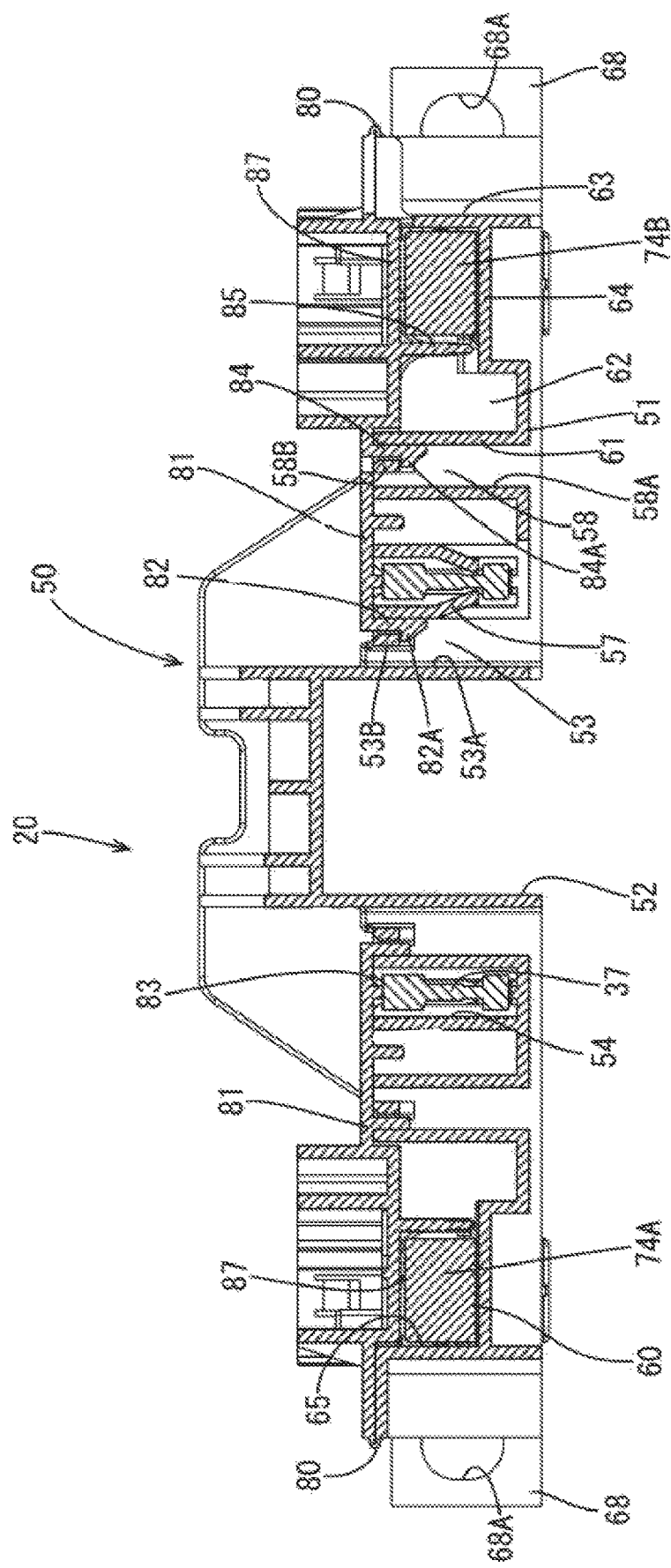
FIG. 9 is a cross-sectional view taken along line A-A in FIG. 4.

In addition, near a center of the pair of groove walls in the front-back direction (Y direction), rail engaging pieces 57 that extend obliquely downward to the inside are formed by raising a part of the groove walls (see FIG. 9).

A sidewall 61, which is on the outer side of the second locking part 58 in the left-right direction, includes a pair of partition walls 62 that extends sideward (X direction) and in the up-down direction (Z direction). At the position more on the outside than the partition wall 62 and separated sideward from the sidewall 61 by a predetermined distance, a first guide wall 63 that extends in the front-back direction (X direction) and the up-down direction (Z direction) is provided. Lower edges of the sidewall 61, the partition wall 62, and the first guide wall 63 are connected by the bottom wall 64.

A region with a substantially U shape in the front view, which is surrounded by the first guide wall 63, the bottom wall 64, and the outer edge part of the partition wall 62 in the left-right direction (X direction) is used as the lead-out part 60 (a part of the electric cable housing part 40) described above that guides the plurality of voltage detection lines 27 led from the protective tube 41 to the outside of the holding member 30 (to the front in FIG. 11). The front end of the lead-out part 60 (end part of the electric cable housing part 40) is a lead-out opening 66 through which the voltage detection lines 27 are configured to be led out. In addition, the lead-out part 60 is open on the upper side as illustrated in FIG. 11 (the open part is hereinafter referred to as an opening 65 of the electric cable housing part 40).

At an opening edge part of the lead-out opening 66, an electric cable attachment part 71 is provided to project forward (along the direction where the voltage detection line 27 extends (Y direction)) from the bottom wall 64 through the first hinge part. 70 with flexibility the electric cable attachment part 71, the plurality of voltage detection lines 27 is configured to be attached.

The electric cable attachment part 71 includes a placement part 72 with a flat plate shape, on which the voltage detection line 27 drawn from the lead-out opening 66 is placed. The placement part 72 includes a binding part 73 that binds the voltage detection lines 27 to the electric cable attachment part 71. The binding part 73 is disposed near the tip in the left-right direction (directionwhere the first hinge part 70 extends).

More specifically, the placement part 72 is separated into a first region 72A that is on a base part side (first hinge part 70 side) and a second region 72B that is on a tip side. Side edge parts of these regions 72A and 72B that are opposed to each other include a pair of first rising wall 74A and second rising wall 74B that extends downward in FIG. 11 and in a direction orthogonal to the regions 72A and 72B. That is to say, the first rising wall 74A and the second rising wall 74B are formed to frog a surface opposite to the surface of the placement part 72 where the voltage detection line 27 is placed (the surface connecting to the outer surface of the lead-out part 60).

The first rising wall 74A and the second rising wall 74B that are disposed to face each other are linked by the linking part 75. The linking part 75 is disposed in parallel to the placement part 72 near the center of each of the rising walls 74A and 74B at the rising height from the placement part 72, and the size of the linking part 75 in the left-right direction is set slightly smaller than the size of the placement part 72 in the left-right direction. That is to say, the linking part 75 links the first rising wall 74A and the second rising wall 74B such that the shape of the linking part 75 both in the plan view and in the side view becomes a substantially H-like shape (see FIG. 12).

By forming the binding part 73 where a part of the electric cable attachment part 71 is depressed in this manner, a binding member 88 can be wound around an outer periphery of the electric cable attachment part 71 and the voltage detection line 27 and positioned easily.

The first rising wall 74A and the second rising wall 74B are equal in rising height from the placement part 72. In addition, in a state where the electric cable attachment part 71 is folded back by the first hinge part 70 (FIG. 13), the first rising wall 74A and the second rising wall 74B are set to be slightly lower than the partition wall 62 (see FIG. 9 and FIG. 10). Note that on surfaces of the first rising wall 74A and the second rising wall 74B that are opposite to the surfaces thereof facing each other include a reinforcement rib 76 that extends in a direction that is orthogonal to the placement part 72.

In addition, the bottom wall 64 of the lead-out part 60 includes, at the position corresponding to the linking part 75 described above in the state where the electric cable attachment, part 71 is folded back by the first hinge part 70, a pair of fitting ribs 67 that is fitted to the depression below the linking part 75 (see FIG. 10 and FIG. 11).

At a front edge of the first guide wall 63, a module side fixing part 68 with a plate shape is provided. The module side fixing part 68 extends sideward (to the outside in the left-right direction) and is overlapped on the power storage element side fixing part 16 of the power storage element 10 described above. At a center of the module side fixing part 68, a bolt insertion hole 68A to pass the bolt is provided. These fixing parts 16 and 68 are overlapped on each other and fastened with the bolt; thus, the connection module 20 is fixed to the power storage element group 11.

In addition, an extension part 79 that extends sideward (to the outside in the left-right direction) is provided in a region behind the first guide wall 63. At an upper edge on the outside thereof, a closing part 81 is provided through a second hinge part 80 that extends in the front-back direction. The closing part 81 is formed to, when being folded back by the second hinge part 80, cover the lead-out part 60, the second locking part 58, the rail holding groove 54, and the first locking part 53 collectively.

With respect to the closing part 81, a portion from the crosslinking part 52 to the extension part 79 is referred to as a main body part 51. The main body part 51 and the closing part 81 are linked through the second hinge part 80.

As illustrated in FIG. 9 and FIG. 11, the closing part 81 includes the first locking piece 82, a contact rib 83, and the second locking piece 84 at positions corresponding the first locking part 53, the rail holding groove 54, and the second locking part 58 of the main body part 51, respectively. In addition, the closing part 81 includes a second guide wall 85 that is provided to a position on the lead-out part 60 near the tip of the pair of partition walls 62. In the state where the closing part 81 closed, the second guide wall 85 is disposed in parallel to the first guide wall 63 and the voltage detection line 27 led from the protective tube 41 is guided to the electric cable attachment part 71 between the second guide wall 85 and the first guide wall 63 for sure.

In a region of the second guide wall. 85 for the fitting rib 67, a release part 86 for releasing the fitting rib 67 is formed by cutting.

A region of the closing part 81 that is disposed more on the outside than the second guide wall 85 in the state where the closing part 81 is closed and that is used for the lead-out part 60 serves as a restriction part 87. The restriction part 87 restricts, when the voltage detection line 27 is disposed in the lead-out part 60, the upward removal of the voltage detection line 27. In a case where the first rising wall 74A and the second rising wall 74B are disposed on the lead-out part 60 (the electric cable attachment part 71 is folded back), the restriction part. 87 is brought into contact with or gets close to these rising walls 74A and 74B to restrict the upward movement of the rising walls 74A and 74B. That is to say, the restriction part 87 has a function of holding the electric cable attachment part 71 in a folded-back state (one example of a holding part).

In addition, a surface of the closing part 81 that corresponds to an upper surface when the closing part 81 is closed is provided with a routing groove 89 for routing an electric cable such as a power cable (the routing groove 89 is one example of a second electric cable housing part).

A method of assembling the connection module 20 with the above configuration according to the present embodiment is described next. The assembling method is not limited to method and procedure to be described below.

First, the first hooking part 25 of the bus bar 21 connected to the voltage detection line 27 in advance is hooked with the first hooked part. 35 of the bus bar linking sheet 32, and the second hooking part 26 is hooked with the bus bar holding rail 37; thus, the bus bar 21 is held by the bus bar holding member 31. In addition, the plurality of voltage detection lines 27 connected to the bus bars 21 is arranged in the direction where the bus bars 21 are arranged (front-back direction), and are housed internally through the slit of the protective tube 41. The plurality of voltage detection lines 27 is disposed to the front (Y direction).

Next, the protective tube 41 is placed on the plate-shaped part 33 of the bus bar linking sheet 32, and the protective tube 41 and the bus bar linking sheet 32 are integrated by the binding member 45. The protective tube 41 is shorter than the bus bar linking sheet 32, and in a state where both are integrated, the sheet-side cutoff part 36 of the bus bar linking sheet 32 is disposed at a position projecting in the front-back direction from the end of the protective tube 41.

Next, both ends of the pair of bus bar holding members 31 are linked by the pair of end linking members 50. Specifically, the end of the bus bar holding rail 37 in the bus bar holding member 31 is fitted into the rail holding groove 54 of the end linking member 50 and moreover, the end of the bus bar linking sheet 32 is placed on the bottom wall 64 of the lead-out part 60 of the end linking member 50. The bus bar holding rail 37 is prevented from being detached in the front-back direction when the stopper rib 56 is fitted into the rail-side cutoff part 38, and the bus bar holding rail 37 is prevented from being detached upward by the rail engaging piece 57. The bus bar linking sheet 32 is prevented from being detached in the front-back direction when the fitting rib 67 of the end linking member 50 is fitted into the sheet-side cutoff part 36.

In this state, both ends of the protective tube 41 are placed near the end of the bottom wall 64 of the lead-cut, part 60, and the voltage detection line 27 led from the protective tube 41 is disposed in the lead-out part 60 and led out to the front from the lead-out opening 66.

Next, at the end side (front end side) of the assembled holding member 30 where the voltage detection line 27 is led, the closing part 81 is folded back by the second hinge part 80 and the closing part 81 is closed. Then, the first locking piece 82 and the second locking piece 84 of the closing part 81 are fitted into the holes 53A and 58A of the first locking part 53 and the second locking part 58 of the main body part 51 and in addition, the engaging claws 82A and 84A provided at the tip of the locking pieces 82 and 84 are engaged with the engaged parts 53B and 58B provided to the locking parts 53 and 58. Thus, the closing part 81 is fixed to the main body part 51 (see FIG. 9).

In this state, the contact rib 83 of the closing part 81 is in contact with the upper surface of the bus bar holding rail 37. The second guide wall 85 of the closing part 81 is disposed to face the first guide wall 63 so as to have the plurality of voltage detection lines 27 disposed in the lead-out part 60 sandwiched between the second guide wall 85 and the first guide wall 63 in the main body part 51. Thus, the voltage detection line 27 in the lead-out part 60 is guided to the lead-out opening 66 for sure.

Next, the plurality of voltage detection lines 27 led out from the lead-out opening 66 is attached to the electric cable attachment part 71. Specifically, the electric cable attachment part 71 is extended straight from the lead-out part 60 (the first hinge part 70 is extended) and the plurality of voltage detection lines 27 is placed on the placement part 72. Then, by winding the binding member 88 at the binding part 73, the plurality of voltage detection lines 27 is fixed to the electric cable attachment part 71. Note that the binding members 45 and 88 are formed of an arbitrary material of synthetic resin, metal, or the like as necessary, and have a long and thin band-like shape.

As described above, the assembling of the end (front end) on the side where the voltage detection line 27 is led out is completed. In this assembling, the first hinge part 70 can be bent at an arbitrary angle.

On the other hand, at the end (rear end) on the side where the voltage detection line 27 is not led out, the ends of the pair of bus bar holding members 31 are linked by the end linking member 50 in a manner similar to the above, and then the electric cable attachment part 71 in a single state is folded back by the first hinge part 70 and overlapped on the lead-out part 60. In this state, the first rising wall 74A and the second rising wall 74B rise vertically in the lead-out part 60.

Next, in manner similar to the above, the closing part 81 is folded back by the second hinge part 80 so as to be closed. The closing part 81 is fixed to the main body part 51 when the first locking piece 82 and the second locking piece 84 are locked in the first locking part 53 and the second locking part 58 of the main body part 51.

Figure 10:
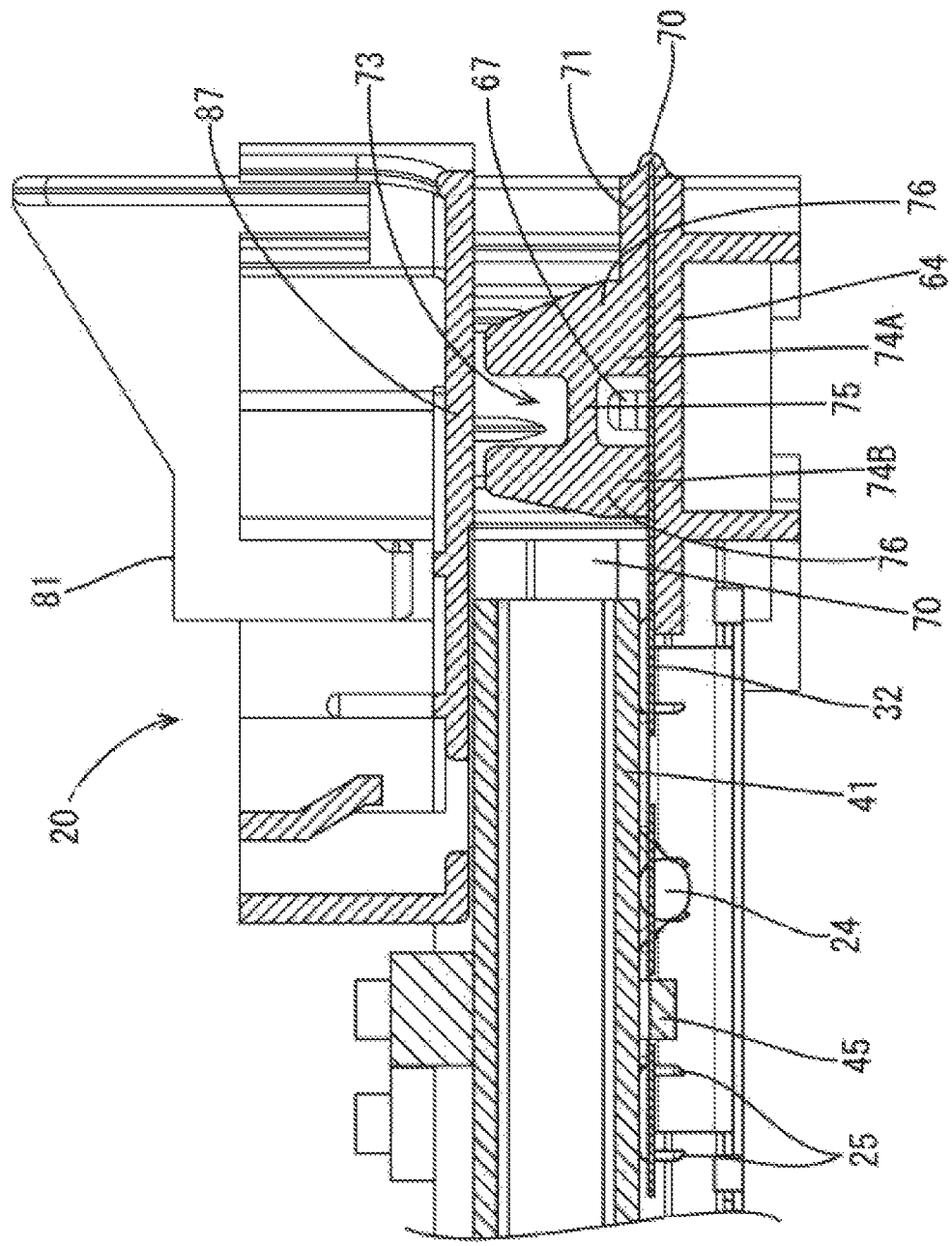
FIG. 10 is a cross-sectional view taken along line B-B in FIG. 4.

In this state, the restriction part 87 of the closing part 81 is disposed above in the state where a small space is formed from the tip of the first rising wall 74A and the second rising wall 74B (see FIG. 9 and FIG. 10). That is to say, when the first rising wall 74A and the second rising wall 743 will move upward, these walls are brought into contact with the restriction part 87 to interfere with each other; thus, the upward movement is restricted. In other words, the folded-back state of the electric cable attachment part 71 including the first rising wall 74A and the second rising wall 74B is held by the closing part 81 (restriction part 87).

In this state, the first rising wall 74A and the second rising wall 74B close the lead-out opening 66. Thus, an unintended entry of a finger or a foreign substance into the lead-out opening 66 can be suppressed.

Next, operations and effects of the connection module 20 according to the present embodiment are described.

The connection module 20 according to the present embodiment includes: the plurality of bus bars 21 that electrically connects the power storage elements 10 that are adjacent; the plurality of voltage detection lines 27 that is connected to the plurality of bus bars 21; and the holding member 30 including the electric cable housing part 40 that houses the plurality of voltage detection lines 27. The electric cable housing part 40 includes the lead-out opening 66 through which the voltage detection lines 27 are configured to be led out, and the electric cable attachment part 71 to which the plurality of voltage detection lines 27 is configured to be attached through the first hinge part 70 with flexibility is provided in a projecting manner at the opening edge part of the lead-out opening 66. The electric cable attachment part 71 is bent toward the electric cable housing part 40 (toward the lead-out opening 66) by the first hinge part 70, and the bent state thereof is configured to be held by the rising walls 74A and 74B of the electric cable attachment part 71 and the restriction part 87 of the closing part 81 (one example of the holding part).

In the connection module 20 as described above, the plurality of voltage detection lines 27 that is led out are attached to the electric cable attachment part 71 on the lead-out opening 66 side where the plurality of voltage detection lines 27 is led out. The electric cable attachment part 71 to which the plurality of voltage detection lines 27 is attached may or may not be bent at an arbitrary angle using the first hinge part 70 as a rotation axis in accordance with the installation position of the connection destination (such as ECU) of the voltage detection line 27.

On the other hand, the electric cable attachment part 71 on the lead-out opening 66 side where the voltage detection line 27 is not led out is folded back toward the electric cable housing part 40 by the first hinge part 70, and the folded-back state is configured to be held by the holding part. Therefore, it is possible to prevent the electric cable attachment part 71, where the voltage detection line 27 is not attached, from projecting outward to become an obstacle. The electric cable attachment part 71 that is held in the folded-back state is not easily affected by the vibration from the vehicle. Note that the folded-back state corresponds to one example of the bent state.

In the connection module 20 according to the present embodiment, the electric cable attachment part 71 is disposed in the bent state (folded-back state) to close the lead-out opening 66. Specifically, the electric cable attachment part 71 includes, on an outer surface side (surface opposite to surface where the voltage detection line 27 is provided), the first rising wall 74A and the second rising wall 74B extending in the direction that is orthogonal to the electric cable attachment part 71 and the direction where the first hinge part 70 extends, and in a state where the electric cable attachment part 71 is folded back to the electric cable housing part 40 by the first hinge part 70, the first rising wall 74A and the second rising wall 74B are disposed to close the lead-out opening 66.

The connection module including the electric cable attachment part also in the lead-out opening where the electric cable is not led out has a problem in that the lead-out opening where the electric cable is not led out is left opened. To solve such a problem, in the present embodiment, the lead-out opening 66 that is open is closed by the bent electric cable attachment part 71 (rising wall 74); therefore, the unintended entry of a finger or a foreign substance through the lead-out opening 66 can be suppressed.

In the present embodiment, the opening 65 that is opened to the direction where the voltage detection line 27 extends is provided to the lead-out part 60 of the electric cable housing part 40 (part adjacent to the lead-out opening 66), and the closing part 81, which closes the opening 65, is provided to be integrated with the end linking member 50 (holding member 30) through the second hinge part 80.

In this configuration, the opening 65 of the electric cable housing part 40 (lead-out part 60) provided to the end linking member 50 can be closed by rotating the closing part 81 using the second hinge part 80 as a rotation axis.

Moreover, the electric cable attachment part 71 in the present embodiment includes, on an outer surface side (surface opposite to surface where the voltage detection line 27 is provided), the first rising wall 74A and the second rising wall 74B extending in the direction that is orthogonal to the electric cable attachment part 71 and the direction where the first hinge part 70 extends. When the closing part 81 that closes the opening 65 interferes with the first rising wall 74A and the second rising wall 74B, the electric cable attachment part 71 that is folded back to the electric cable housing part 40 by the first hinge part 70 is held in the folded-back state.

In this configuration, the folded-back state of the electric cable attachment part 71 is held by the holding part including the first rising wall 74A and the second rising wall 74B and the closing part 81; thus, an additional holding part is not necessary.

In the state where the opening 65 is closed by the closing part 81, the second electric cable housing part 40 that can house the electric cable at the outer surface of the closing part 81 is provided; therefore, another electric cable such as an electric cable for power source can be disposed in the connection module 20.

The holding member 30 according the present embodiment includes the pair of bus bar holding members 31 that holds the plurality of bus bars 21 in the direction where the power storage elements 10 are arranged, and the pair of end linking members 50 that links the ends of the pair of bus bar holding members 31. A part of the electric cable housing part 40 (lead-out part 60) is provided to the end linking member 50, and the electric cable attachment part 71 is provided to the end linking member 50 through the first hinge part 70.

In this configuration, in the case where the connection module 20 is formed using the pair of end linking members 50 as described in the present embodiment, the end linking members 50 can be shared between on the side where the voltage detection line 27 is led out and on the side where e voltage detection line 27 is not led out. That is to say, even if the electric cable attachment part 71 that is necessary on the side where the voltage detection line 27 is led out is provided to the end linking member 50 on the side where the voltage detection line 27 is not led out, the electric cable attachment part 71 is bent to the electric cable housing part 40 and the bent state is held by the holding part. Therefore, the electric cable attachment part 71 does not become an obstacle and the vibration from the vehicle does not transmit easily. As a result, the common end linking members 50 can be used and the manufacturing cost can be suppressed.

Second Embodiment

Next, a second embodiment is described with reference to FIG. 15 to FIG. 22. Note that only a configuration of an end linking member 120 that is different from that in the first embodiment is described below. The configuration similar to that in the first embodiment, denoted by a reference sign of the configuration in the first embodiment to which 70 is added. Other members than the end linking member 120 are denoted by the same reference signs as those in the first embodiment. In addition, the lower left side is the front in FIG. 17.

A connection module 90 according to the present embodiment is different from the connection module in the first embodiment in a mode of an electric cable attachment part 141 of the end linking member 120 and a holding structure of the electric cable attachment part 141.

Figure 17:
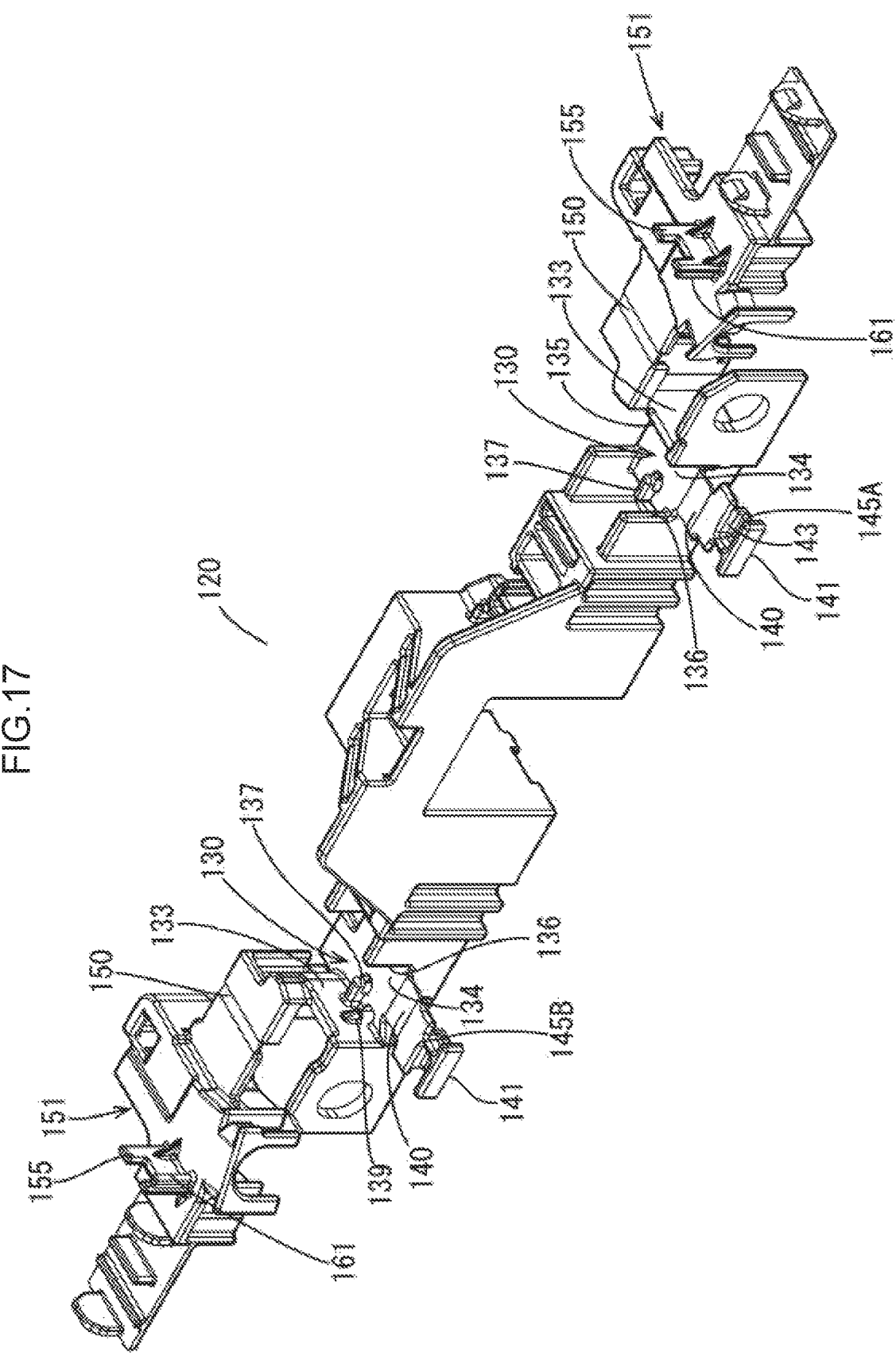
FIG. 17 is a perspective view of the front side of the end linking member.

In the end linking member 120 according to the present embodiment, as illustrated in FIG. 17, the electric cable attachment part 141 to which the plurality of voltage detection lines 27 is configured to attached is provided at the opening edge part of a lead-out opening 136 of a lead-out part 130 so as to project forward (to the direction (Y direction) where the voltage detection line 27 extends) from a bottom wall 134 through a first hinge part 140 with flexibility.

Near the tips of the pair of side edge parts of the electric cable attachment part 141 in the present embodiment, a pair of cutoff concave parts 145 is formed. The cutoff concave part 145 is formed by cutting in a concave shape such that a binding member 158 for binding the voltage detection lines 27 to the electric cable attachment part 141 is fitted.

Of the pair of cutoff concave parts 145, a cutoff concave part 145A disposed on the outside in the left-right direction extends in a manner that a placement surface side where the voltage detection line 27 is placed is depressed toward the inside (center) of the electric cable attachment part 141, and a fitting concave part 143 to which a fitting rib 137 provided at the bottom wall 134 of the lead-out part 130 is fitted is formed. The other cutoff concave part 145B can receive the fitting rib 137 in this cutoff concave part 145B (see FIG. 18).

Figure 19:
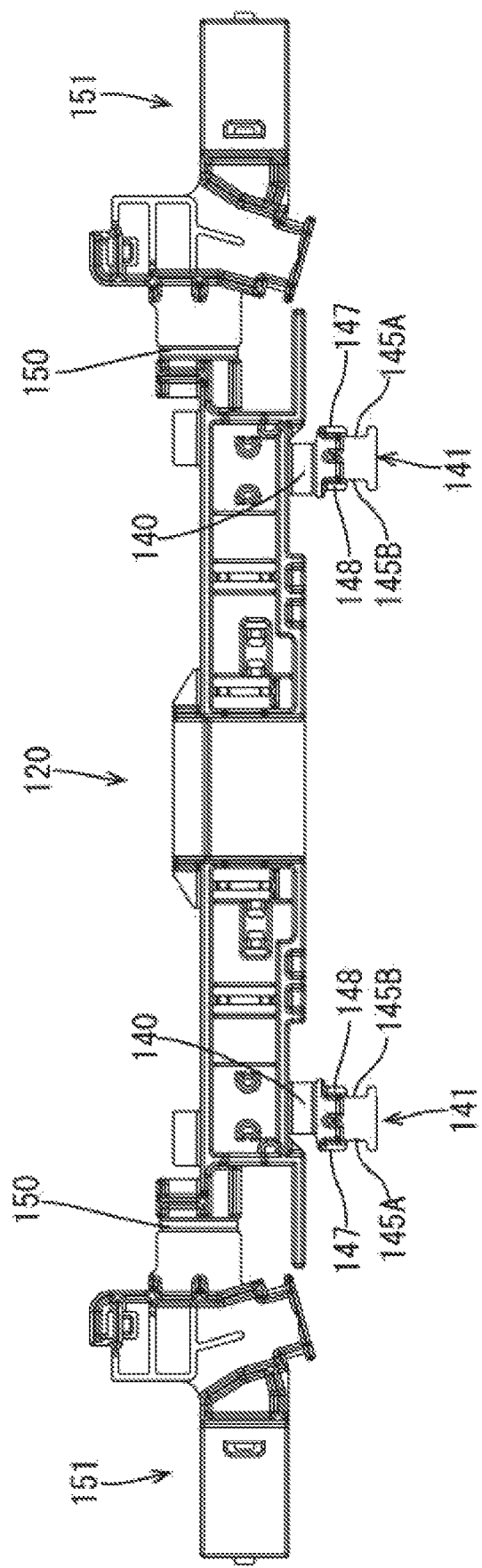
FIG. 19 is a bottom view of the end linking member.
Figure 20:
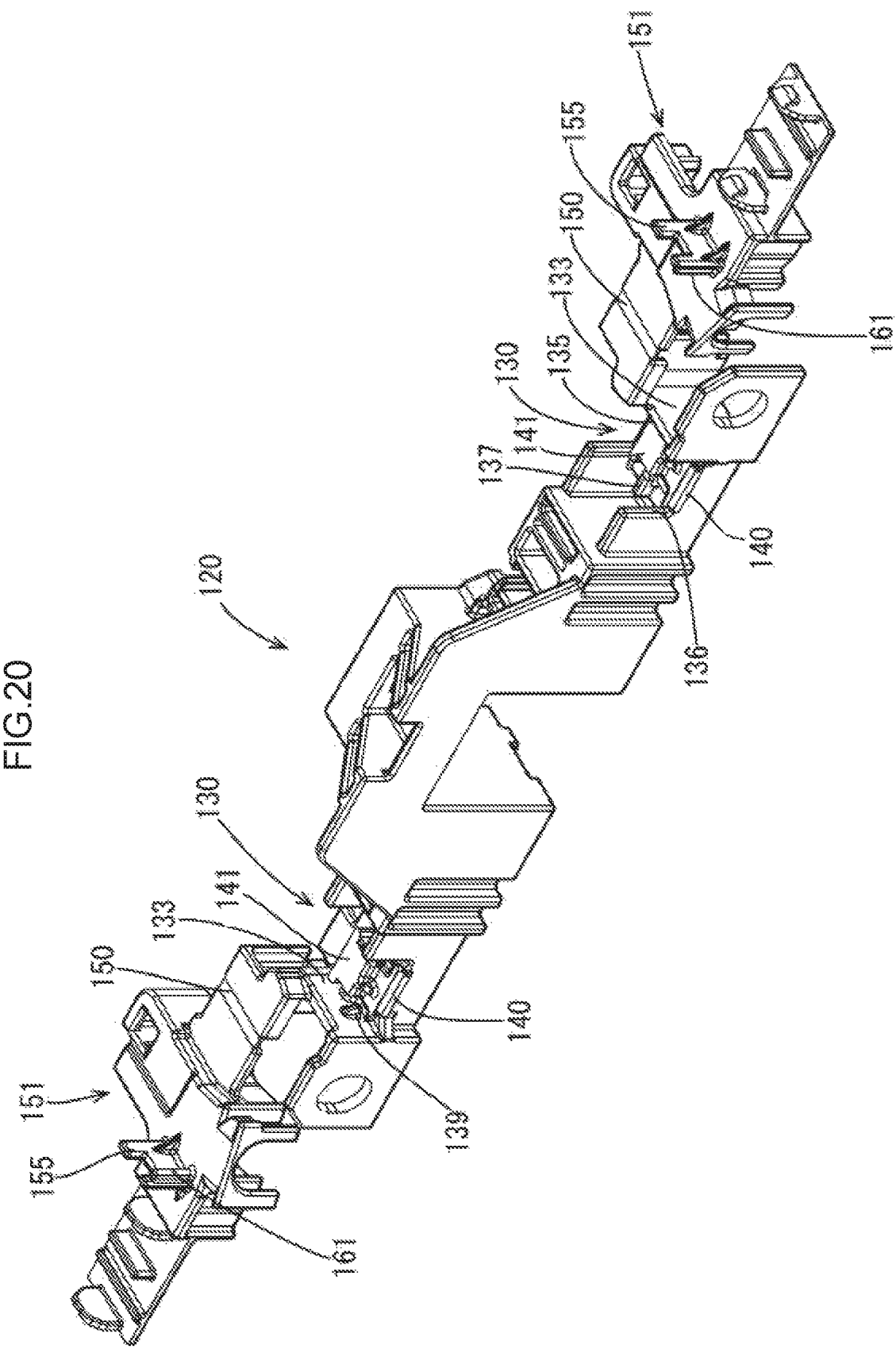
FIG. 20 is a perspective view of the front side of the end linking member in the state where the electric cable attachment part is folded back.
Figure 21:
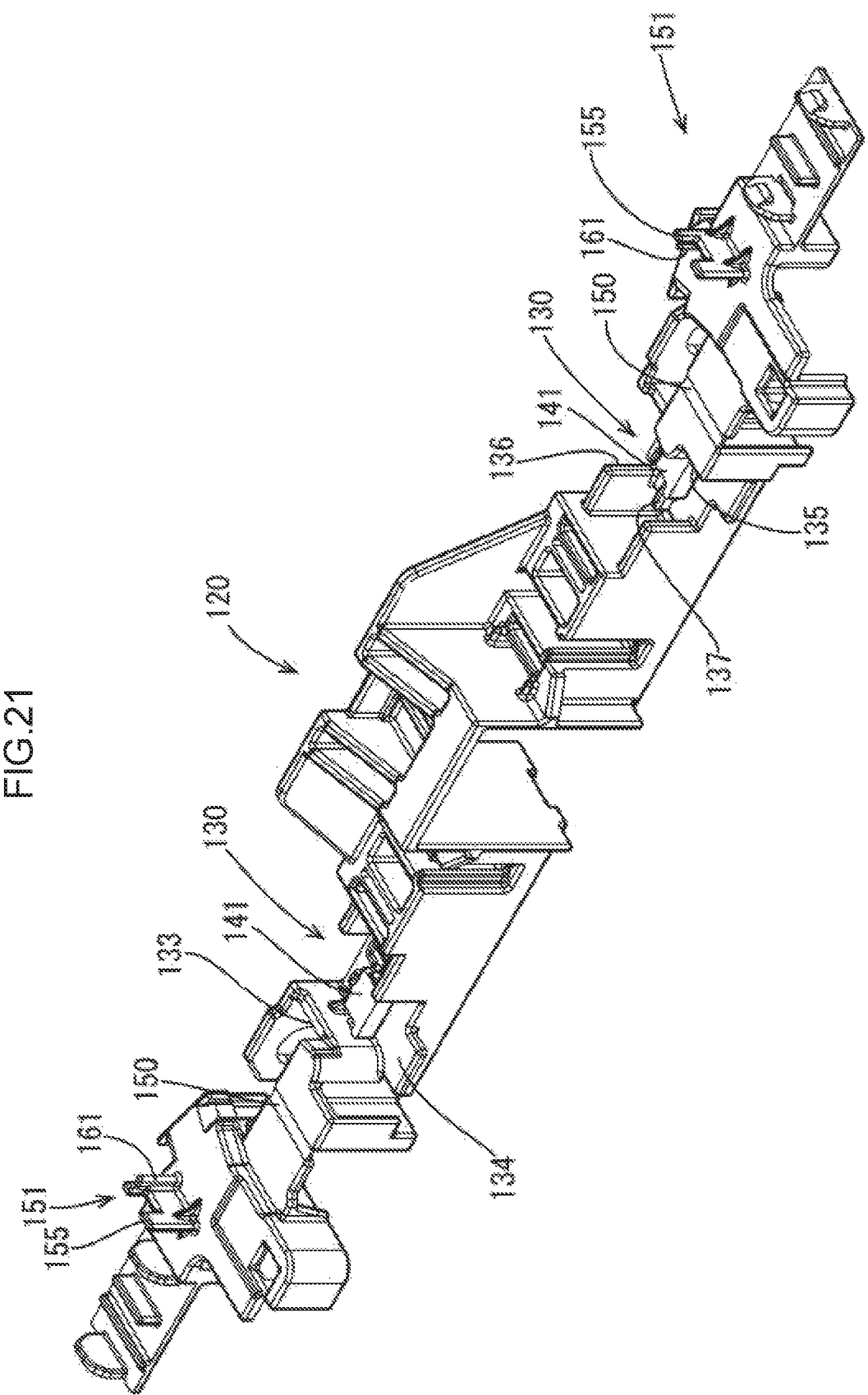
FIG. 21 is a perspective view of the rear side of the end linking member in the state where the electric cable attachment part is folded back.

In addition, more on a base end side (first hinge part 140 side) than the pair of cutoff concave parts 145, parts that are depressed from the outer surface (surface opposite to surface where the voltage detection line 27 is disposed) are provided and these parts serve as engaged parts 147 and 148 to be engaged with a pair of engaging parts 139 and 161 (see FIG. 19). The engaged part on the out e in the left-right direction is hereinafter referred to as a first engaged part 147 and the engaged part on the inside in the left-right direction is hereinafter referred to as a second engaged part 148.

The lead-out part 130 includes a first engaging part 139 (one example of the holding part) that, when the electric cable attachment part 141 is folded back by the first hinge part 140, holds the electric cable attachment part 141 in the folded-back state by engaging with the first engaged part 147 from above. The first engaging part 139 is provided to project from a first guide wall 133 (see FIG. 17 and FIG. 18).

Figure 18:
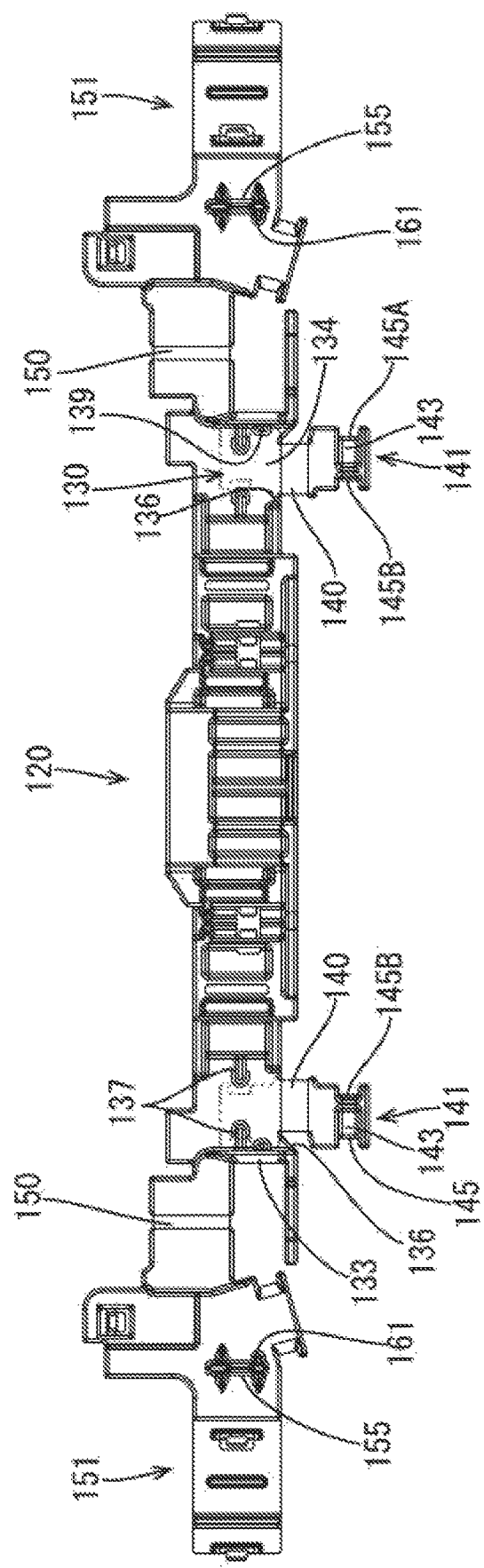
FIG. 18 is a plan view of the end linking member.

At a front edge of a second guide wall 155 provided to a closing part 151, a second engaging part 161 (one example of the holding part) is provided to project from the second guide wall 155 (see FIG. 17 and FIG. 18). In a state where the closing part 151 is folded back by the second hinge part 150 to close an opening 135, the second engaging part 161 extends to the inside of the lead-out part 130 to be engaged with the second engaged part 148 from above; thus, the electric cable attachment part 141 is held in the folded-back state.

In the connection module 90 according to the present embodiment as described above, the Plurality of voltage detection lines 27 that is led out are attached to the electric cable attachment part 141 on the lead-out opening 136 wide where the plurality of voltage detection lines 27 is led out. On the other hand, the electric cable attachment part 141 on the lead-out opening 136 side where the voltage detection lines 27 are not led out is folded back to the electric cable housing part 110 (lead-out part 13) by the first hinge part 140, and the folded-back state is configured to be held by the holding part (the engaging structure between the engaging parts 139 and 161, and the engaged parts 147 and 148). Therefore, the electric cable attachment part 141 to which the voltage detection line 27 is not attached will not project outward or become an obstacle. Additionally, the electric cable attachment part 141 that is held in the folded-back state in this manner is not easily affected by the vibration from the vehicle.

Other Embodiments

The technology described herein is not limited to the embodiments described above and with reference to the drawings. The following embodiments may be included in the technical scope.

(1) In the above embodiments, the electric cable housing parts 40 and 110 include the protective tube 41 and the lead-out parts 60 and 130 of the end linking members 50 and 120. However, the protective tube may be omitted and the electric cable housing parts may be formed using the lead-out part only.

(2) In the first embodiment, the electric cable attachment part 71 is folded back by the first hinge part 70 and the lead-out opening 66 is closed by the rising wall 74. However, for example, the lead-out opening may be closed by the placement part by bending the first hinge part in an L-like shape.

(3) In the above embodiments, four electric cable attachment parts 71 and 141 are provided to one connection Module 20 and 90. However, the number of electric cable attachment parts to be provided to one connection module is not limited to a particular number. The electric cable attachment part can be formed at any position as necessary.

(4) In the above embodiments, the plurality of electric cables is the voltage detection lines 27 to detect the voltage of the power storage elements 10. However, the plurality of electric cables may be the cables to detect the temperature of the power storage elements. The plurality of electric cables does not need to be connected to the power storage element. For example, the plurality of electric cables connected to other device than the power storage module may be disposed in the connection module.

(5) In the above embodiments, the holding member 30 is formed by assembling the pair of bus bar holding members 31 and the end linking members 50 and 120 that link the ends of the pair of bus bar holding members 31. However, the holding members may be an integrated type.

(6) In the above embodiments, the holding part that holds the electric cable attachment parts 71 and 141 in the bent state by the closing parts 81 and 151 provided to the holding member 30 (end linking members 50, 120) is provided. However, the holding part is not limited to the part described in the above embodiments, and may have another configuration.

The invention claimed is:

1. A protector comprising:
an electric cable housing part which includes a bottom wall, a side wall, and a guide wall that define a cable housing space, the electric cable housing part including a lead-out opening at an end of the electric cable housing part, the lead-out opening through which electric cables are configured to be led out; and
an electric cable attachment part extending from the end of the electric cable housing part and to which the electric cables are configured to be attached, the electric cable attachment part including a flexible hinge portion provided at an end of the bottom wall, and a plate portion continuing from the hinge portion, the plate portion being configured to be folded on the hinge portion, so that the plate portion faces the bottom wall.

2. The protector according to claim 1, wherein:
the plate portion of the electric cable attachment part includes a first face and a second face, the first face being configured to receive the electric cables, and
the electric cable attachment part further includes a rising wall protruding from the second face, so that the rising wall is positioned in the cable housing space when the plate portion is folded on the hinge portion.

3. The protector according to claim 1, further comprising a closing part extending from the guide wall in an opposite direction to the electric cable housing part, wherein:
the hinge portion of the electric cable attachment part is defined as a first hinge portion,
the closing part including a cover portion and a second hinge portion having flexibility,
the second hinge portion is provided between the guide wall and the cover portion, and
the closing part is configured to be folded on the second hinge portion, so that the cover portion is positioned on the guide wall and the side wall.

4. The protector according to claim 3, wherein:
the plate portion of the electric cable attachment part includes a first face and a second face, the first face being configured to receive the electric cables,
the electric cable attachment part further includes a rising wall protruding from the second face, so that the rising wall is positioned in the cable housing space when the plate portion is folded on the first hinge portion, and
the cover portion contacts an end of the rising wall when the cover portion is positioned on the guide wall and the side wall.

5. The protector according to claim 4, wherein
the closing part includes a first face and a second face,
the first face of the closing part faces the bottom wall when the closing part is folded on the second hinge portion, and
the second face of the closing part is configured to receive an electric cable different from the electric cables attached on the electric cable attachment part.

6. The protector according to claim 1, further comprising a holder part projecting from one of the guide wall and the side wall, the holder part engaging with the electric cable attachment part when the plate portion is folded on the hinge portion.

7. A connection module to be attached to a power storage element group including a plurality of power storage elements that is arranged, the connection module comprising:
a plurality of bus bars that electrically connects the plurality of power storage elements that are adjacent;
a plurality of electric cables that is connected to the plurality of bus bars; and
a holding member including an electric cable housing part that houses the plurality of electric cables,
wherein:
the electric cable housing part includes a bottom wall, a side wall, and a guide wall that define a cable housing space, and a lead-out opening at an end of the electric cable housing part, the lead-out opening through which the plurality of electric cables is configured to be led out, and an electric cable attachment part extends from the end of the electric cable housing part and the plurality of electric cables is configured to be attached to the electric cable attachment part, the electric cable attachment part including a flexible hinge portion provided at an end of the bottom wall, and a plate portion continuing from the hinge portion, the plate portion being configured to be folded on the hinge portion, so that the plate portion faces the bottom wall.

8. The connection module according to claim 7, wherein:

the plate portion of the electric cable attachment part includes a first face and a second face, the first face being configured to receive the plurality of electric cables, and the electric cable attachment part further includes a rising wall protruding from the second face, so that the rising wall is positioned in the cable housing space when the plate portion is folded on the hinge portion.

9. The connection module according to claim 7, further comprising a closing part extending from the guide wall in an opposite direction to the electric cable housing part, wherein:

the hinge portion of the electric cable attachment part is defined as a first hinge portion, the closing part including a cover portion and a second hinge portion having flexibility, the second hinge portion is provided between the guide wall and the cover portion, and the closing part is configured to be folded on the second hinge portion, so that the cover portion is positioned on the guide wall and the side wall.

10. The connection module according to claim 9, wherein:

the plate portion of the electric cable attachment part includes a first face and a second face, the first face being configured to receive the electric cables, the electric cable attachment part further includes a rising wall protruding from the second face, so that the rising wall is positioned in the cable housing space when the plate portion is folded on the first hinge portion, and the cover portion contacts an end of the rising wall when the cover portion is positioned on the guide wall and the side wall.

11. The connection module according to claim 10, wherein the closing part includes a first face and a second face, the first face of the closing part faces the bottom wall when the closing part is folded on the second hinge portion, and the second face of the closing part is configured to receive an electric cable different from the plurality of electric cables attached on the electric cable attachment part.

12. The connection module according to claim 7, wherein:

the holding member includes a pair of bus bar holding members that holds the plurality of bus bars along a direction where the plurality of power storage elements is arranged, and a pair of end linking members that links ends of the pair of bus bar holding members, at least a portion of the electric cable housing part is provided to an end linking member of the pair of end linking members, and the electric cable attachment part is provided to the end linking member through the hinge part.

13. The connection module according to claim 7, further comprising a holder part projecting from one of the guide wall and the side wall, the holder part engaging with the electric cable attachment part when the plate portion is folded on the hinge portion.

* * * * *